(12) United States Patent
Eustis

(10) Patent No.: US 10,746,480 B2
(45) Date of Patent: Aug. 18, 2020

(54) PLURAL HEAT PUMP AND THERMAL STORAGE SYSTEM FOR FACILITATING POWER SHAPING SERVICES ON THE ELECTRICAL POWER GRID AT CONSUMER PREMISES

(71) Applicant: Portland General Electric Company, Portland, OR (US)

(72) Inventor: Conrad Eustis, Portland, OR (US)

(73) Assignee: Portland General Electric Company, Portland, OR (US)

( * ) Notice: Subject to any disclaimer, the term of this patent is extended or adjusted under 35 U.S.C. 154(b) by 287 days.

(21) Appl. No.: 15/581,528

(22) Filed: Apr. 28, 2017

(65) Prior Publication Data

US 2017/0227299 A1    Aug. 10, 2017

Related U.S. Application Data

(62) Division of application No. 13/633,793, filed on Oct. 2, 2012, now Pat. No. 9,677,809.

(Continued)

(51) Int. Cl.
*F28D 20/00* (2006.01)
*F25D 31/00* (2006.01)
(Continued)

(52) U.S. Cl.
CPC ............ *F28D 20/0034* (2013.01); *F25B 7/00* (2013.01); *F25B 30/02* (2013.01); *F25B 30/06* (2013.01);
(Continued)

(58) Field of Classification Search
CPC ........ F28D 20/0034; F25B 30/02; F25B 7/00; F25B 49/02; F25B 30/06; F25D 31/002
See application file for complete search history.

(56) References Cited

U.S. PATENT DOCUMENTS 3,593,578 A * 7/1971 Farrell .................. G01K 17/14
374/40
3,729,051 A   4/1973 Mannion et al.
(Continued)

FOREIGN PATENT DOCUMENTS

JP    2000241037 A  *  9/2000
JP    2001-147033       5/2001
(Continued)

OTHER PUBLICATIONS

Narita et al., Heat Pump System, Jan. 12, 2006, JP2006010137A, Whole Document (Year: 2006).*

(Continued)

*Primary Examiner* — Larry L Furdge
(74) *Attorney, Agent, or Firm* — Klarquist Sparkman, LLP

(57) ABSTRACT

A system and method for storing energy from an electrical grid utilizes a system heat pump at a premises for transferring energy from the grid to a thermal storage reservoir and a premises heat pump that can use the stored energy to provide, for example, heat to the premises. The system heat pump and premises heat pump desirably operate independently of one another so that energy can be transferred to the thermal storage reservoir regardless of whether energy is being withdrawn by the premises heat pump. Plural energy storage systems utilizing respective system and premises heat pumps and thermal storage reservoirs can form a part of the utility customer system with the system heat pumps being operable to shape the load on the electrical grid. A system heat pump can be operated to minimize a customer's bill, or the utility's cost and alternatively to achieve other purposes, depending upon the mode of operation of the system.

26 Claims, 6 Drawing Sheets

Related U.S. Application Data

(60) Provisional application No. 61/545,513, filed on Oct. 10, 2011.

(51) Int. Cl.
  *F25B 7/00* (2006.01)
  *F25B 30/02* (2006.01)
  *F25B 30/06* (2006.01)
  *F25B 49/02* (2006.01)

(52) U.S. Cl.
  CPC ............ *F25B 49/02* (2013.01); *F25D 31/002* (2013.01); *F25B 2339/047* (2013.01); *F25B 2400/24* (2013.01); *F25B 2500/19* (2013.01); *F25B 2600/01* (2013.01); *F25B 2600/0253* (2013.01); *F25B 2600/07* (2013.01); *F25B 2700/15* (2013.01); *F28D 2020/0082* (2013.01); *Y02B 30/741* (2013.01)

(56) References Cited

U.S. PATENT DOCUMENTS

| | | | |
|---|---|---|---|
| 4,012,920 A | 3/1977 | Kirschbaum |
| 4,110,987 A | 9/1978 | Cahn et al. |
| 4,143,642 A | 3/1979 | Beaulieu |
| 4,167,965 A | 9/1979 | Rogers |
| 4,237,859 A | 12/1980 | Goettl |
| 4,242,872 A | 1/1981 | Shaw |
| 4,256,475 A | 3/1981 | Schafer |
| 4,378,908 A | 4/1983 | Wood |
| 4,390,008 A | 6/1983 | Andrews |
| 4,527,618 A | 7/1985 | Fyfe et al. |
| 4,645,908 A | 2/1987 | Jones |
| 5,317,670 A | 5/1994 | Elia |
| 5,941,238 A | 8/1999 | Tracy |
| 6,681,593 B1 | 1/2004 | Gundlach |
| 7,441,558 B2 | 10/2008 | Leifer et al. |
| 7,958,885 B2 | 6/2011 | Leifer et al. |
| 2005/0102068 A1* | 5/2005 | Pimputkar ............ H02J 3/14 700/291 |
| 2006/0065750 A1 | 3/2006 | Fairless |
| 2007/0205298 A1 | 9/2007 | Harrison |
| 2008/0092875 A1 | 4/2008 | Leifer et al. |
| 2009/0120124 A1 | 5/2009 | Anderson |
| 2009/0173336 A1 | 7/2009 | Leifer et al. |
| 2009/0187445 A1 | 7/2009 | Barclay et al. |
| 2009/0288430 A1 | 11/2009 | Anderson |
| 2010/0043461 A1 | 2/2010 | Pan |
| 2010/0096104 A1 | 4/2010 | Alden |
| 2010/0163016 A1 | 7/2010 | Pan |
| 2010/0187219 A1 | 7/2010 | Besore et al. |
| 2011/0030753 A1 | 2/2011 | Weaver et al. |

FOREIGN PATENT DOCUMENTS

| | | |
|---|---|---|
| JP | 2006010137 A * | 1/2006 |
| JP | 2006-138493 A | 6/2006 |
| JP | 2006138493 A * | 6/2006 |

OTHER PUBLICATIONS

Mizutani et al., Heat Storage Air Conditioner, Sep. 8, 2000, JP2000241037A, Whole Document (Year: 2000).*

Uchise, Hot Water Storage Type Water Heater, Jun. 1, 2006, JP2006138493, Whole Document (Year: 2006).*

* cited by examiner

PLURAL HEAT PUMP AND THERMAL STORAGE SYSTEM FOR FACILITATING POWER SHAPING SERVICES ON THE ELECTRICAL POWER GRID AT CONSUMER PREMISES

CROSS REFERENCE TO RELATED APPLICATION

This application is a Divisional of U.S. patent application Ser. No. 13/633,793, entitled "PLURAL HEAT PUMP AND THERMAL STORAGE SYSTEM FOR FACILITATING POWER SHAPING SERVICES ON THE ELECTRICAL POWER GRID AT CONSUMER PREMISES", filed Oct. 2, 2012, which application claims the benefit of U.S. Provisional Application Ser. No. 61/545,513, entitled DUAL HEAT PUMP AND THERMAL STORAGE SYSTEM FOR FACILITATING POWER SHAPING SERVICES ON THE ELECTRICAL POWER GRID AT CONSUMER PREMISES, filed on Oct. 10, 2011, both of which applications are incorporated by reference herein.

TECHNICAL FIELD

This disclosure relates to a method to mitigate peak electric demand and to effectively store excess energy generated by variable power sources at user premises for later use. This disclosure also relates to a unique energy storage system at user premises.

BACKGROUND

It is becoming more common for unpredictable power sources to be used to generate electricity, such as wind turbines and solar panels. When wind turbines are connected to an electrical grid, even on windy days the turbines generate varying power levels; the arrival and departure time of the wind resource can vary from the forecast by hours. Similarly, solar panels generate power, even on sunny days, at varying power levels. When these types of power sources are connected to the electrical grid, existing expensive resources must be assigned to compensate, or shape, the large variations in power production from wind and solar resources. When the electrical load on the grid does not exceed the power generated by the variable power sources and other grid connected power sources, there is excess power being delivered to the grid. In such a case, power from the power sources needs to be reduced to balance the electrical demand unless the power can somehow be stored for later retrieval and use, such as when peak demand exceeds power being supplied to the grid by the power sources. Also, by storing energy for later retrieval, selected power sources (such as inefficient gas-fired generation plants) can be operated at a lower capacity as the stored energy can be used to supplement power from other, more efficient, power sources. The thermal storage in this system can be used to reduce consumption of electricity for heating and cooling at times of peak system demand.

SUMMARY

It is common for user sites or premises to use electrical power for heating and cooling of these sites. It is also common for these sites to operate a heat pump to meet the building demand for heating and cooling needs. In accordance with one aspect of an embodiment of this disclosure, plural heat exchangers at or adjacent to a power users premises in combination with a thermal storage reservoir at or adjacent to the power users premises are provided as part of a heating (and/or cooling) system that can store excess power from an electrical power grid in the form of thermal energy. The stored energy can be retrieved at a later date for use in providing heating or cooling needs for the premises, such as during high or peak loads on the electric power grid. By providing energy from storage to the premises under such conditions, the amount of grid power required for the premises is reduced. This approach also reduces costs to the electrical power user and the operator of the electrical power grid as the grid can be operated with more efficient, less costly power generation options. In addition, many electric utilities charge lower or different rates depending upon the time of day that electric power is used. At high cost power usage times, the new system can be operated to extract energy from the thermal storage reservoir to the extent it is available, thereby reducing the need for using high cost power from the electric power grid. Conversely, during off-peak or low-energy cost times, such as at night, or when generation resources exceed load as described above, the new system can increase power demand from the grid by increasing the energy that is stored as thermal storage.

A plural heat pump system allows the independent operation of two or more heat pumps. During a heating cycle, one heat pump (a system heat pump) can be used to provide energy to a thermal storage device and another heat pump (one or more premises heat pumps) can be used to extract energy from the thermal storage device. These system and premises heat pumps desirably can be operated independently of one another such that energy can be provided to the thermal storage reservoir regardless of whether energy is being extracted from the thermal storage reservoir by the other heat pump. More than one premises heat pump can be provided in a system, such as one to meet domestic hot water needs. Also, although not likely, more than one system heat pump can be included as system heat pumps. During a cooling cycle, the system heat pump can be operated to extract heat from the thermal storage reservoir.

In a desirable heat storage system, the thermal storage reservoir can use a low-cost, non-toxic liquid, such as water, as a heat storage fluid with salt water being one specific example. Desirably the thermal storage reservoir comprises a plural tank or plural compartment vessel. The tanks can be isolated from one another in the sense that each can constitute a storage area for a separate volume of liquid and thermal energy. These tanks can be operated such that the tanks have different temperature liquid therein. Desirably, the tanks can be insulated from external temperature conditions, such as the outdoor environment if the tanks are located outdoors. If located indoors, the tanks can be shielded from adjacent walls and other structures to prevent water damage from condensation that can form at the exterior of the tanks.

In accordance with one embodiment, a system for storing energy from an electrical grid at a plurality of discrete locations is disclosed. This system comprises at least one energy storage system at each of the plurality of locations. Each of the energy storage systems in this embodiment comprising: a thermal storage reservoir at the location for containing liquid that can be heated or cooled to respectively add energy to or remove energy from the thermal storage reservoir; a system heat pump coupled to the electrical grid to receive electrical energy from the grid to power the system heat pump, the system heat pump being operable to convert electrical energy from the grid to thermal energy, the system heat pump being coupled to the thermal storage reservoir and operable to perform at least one of: (a) delivering thermal energy to the thermal storage reservoir to heat the liquid in the thermal storage reservoir, and (b) removing thermal energy from the thermal storage reservoir to cool the liquid in the thermal storage reservoir; and a premises heat pump coupled to the electrical grid to receive electrical energy from the electrical grid to power the premises heat pump, the premises heat pump being coupled to the thermal storage reservoir and operable to perform at least one of: (a) removing thermal energy from the thermal storage reservoir for delivery to the premises at the location to provide heat to the premises, and (b) delivering thermal energy from the premises to the thermal storage reservoir to provide cooling for the premises. The heat pumps can be coupled to the thermal storage reservoir through heat exchangers that enable the heat pumps to transfer energy to and remove energy from the thermal storage reservoir. Either the heat pump working fluid (e.g. refrigerant) or liquid stored in the thermal storage reservoir circulated to the heat pumps can be used to transfer heat in the system.

As a desirable aspect of the above embodiment, the premises heat pump can be operable to remove thermal energy from or deliver thermal energy to the thermal reservoir independently of whether the system heat pump is delivering thermal energy to or removing thermal energy from the thermal storage reservoir.

The system can be operated in premises heating applications, premises cooling applications and/or in applications where both premises heating and cooling loads are addressed. Thus, as an aspect of an embodiment, the system heat pump can be operable to deliver thermal energy to the thermal storage reservoir and the premises heat pump can be operable to remove heat from the thermal storage reservoir for delivery to the premises to heat the premises. In addition, as another aspect, the system heat pump can be operable to remove thermal energy from the thermal storage reservoir to cool the thermal storage reservoir and the premises heat pump is operable to deliver thermal energy from the premises to the thermal storage reservoir to provide cooling for the premises. In addition, as a further aspect, the system heat pump can be operable to both deliver thermal energy to and remove thermal energy from the thermal storage reservoir and wherein at least one premises heat pump at the premises is operable to both deliver thermal energy to and remove thermal energy from the premises.

In accordance with a further aspect, the energy storage system can comprise a first electricity meter for measuring electrical energy delivered from the electrical grid to the premises and a second electricity meter for measuring electrical energy delivered from the electrical grid to the system heat pump. The first electricity meter is typically a meter for the premises. Electricity is often billed to a customer by a utility at different rates (e.g. at a peak rate or rates during high electricity demand times and at one or more lower rates during low or off-peak demand times, such as at night). In accordance with an aspect of this disclosure, at least some of the electrical energy consumed at the premises as measured by the second electricity meter can be electricity billed at a different lower rate than the rate billed for energy measured by the first electricity meter.

As an aspect of an overall system of plural energy storage systems at a plurality of locations, the system heat pump at each of the plural energy storage systems at the different locations can be coupled to an associated thermal storage reservoir at the location of the system heat pump and operated to deliver thermal energy to the associated thermal storage reservoir at least some of the time when wind or solar energy sources coupled to the electrical grid in combination with other power generating sources coupled to the electrical grid are producing more power than the electrical demand on the grid or producing more power than forecasted. Power forecasts from grid coupled power plants and other sources such as wind farms and solar generating facilities are conventional and are available for use in determining which sources are to be coupled to the electricity grid and the capacity at which such sources are to operate. Actual operations can deviate from the forecasts (e.g. the wind blows harder or lasts longer than forecasted by a weather forecast, or there is more solar energy to a solar generation facility than expected from a weather forecast). Also, electricity demand can vary from the forecasted demand. The system heat pumps can be operated as a cushion to store more energy (e.g. operate at a higher power level in the case of a variable speed system heat pump, or for a longer time) to increase demand in the event the power generation is higher than expected or demand is lower than expected. Conversely, if power generation is lower than forecast or demand is higher than forecast, the system heat pumps can be operated at a lower power level, or for less time (such as not being operated) with energy stored in the thermal storage reservoir being used for heating and/or cooling the premises to reduce the demand on the grid.

In one desirable form, the thermal storage reservoir of the energy storage system can comprise plural tanks with liquid flow paths there between. The flow of liquid between the tanks can be controlled to control the temperature of the liquid in the respective tanks.

In addition, in accordance with an aspect of an embodiment, one or more, such as a plurality of, the energy storage systems can each comprise a hot water heat pump coupled to the electrical grid to receive electrical energy from the electrical grid. The hot water heat pump is desirably coupled to the thermal storage reservoir and operable to remove thermal energy from the thermal storage reservoir for delivery to the premises at the location to provide heat for heating water at the premises. The hot water heat pump is also desirably operable to remove thermal energy from the thermal storage reservoir independently of whether the system heat pump is delivering thermal energy to the thermal storage reservoir. In addition, the system heat pump is also desirably operable to deliver thermal energy to the thermal storage reservoir independently of whether the hot water heat pump is removing heat from the thermal storage reservoir.

As another aspect of an embodiment, the energy storage system can comprise a first electricity meter, such as the meter for the premises, operable to measure electrical energy delivered from the electrical grid to the premises and a second meter operable to measure at least one of the thermal energy delivered from the system heat pump to the thermal storage reservoir or removed from the thermal storage reservoir by the system heat pump. The second meter can be a Btu meter, such as positioned at or downstream from the output of the system heat pump or otherwise positioned to measure energy transferred to, and/or removed from, the thermal storage reservoir. Wherein the premises (e.g. the building owner, lessor, and/or occupant) can be billed for electrical energy measured by the first meter and the thermal energy measured by the second meter. In addition, the thermal energy measured by the second meter can be billed at a rate that is less than the highest rate (e.g. a peak demand rate) at with electrical power measured by the first meter is being billed.

In accordance with an aspect of an embodiment, the energy usage at a premises can be estimated for a time block, the estimated energy usage for the premises for the time block being updated for first time intervals that are of a shorter duration than the time block, actual energy usage being computed at second time intervals shorter than the first time intervals and being used to update the estimated energy usage for the time block, wherein the system heat pump can be operated to deliver energy to the thermal storage reservoir based at least in part on the estimated energy usage at the premises. For example, in anticipation of a higher demand at the premises during a peak demand time, the system heat pump can be operated longer, or at a higher power level in the case of a variable speed heat pump, to cause the storage of more energy in (or remove more energy from in a cooling application) the thermal storage unit so that energy in the thermal storage unit can be used to provide some of the premises demand during the peak demand time.

As another aspect of an embodiment, in a situation wherein the premises is billed at least at first and second rates for electricity delivered to the premises, the second rate being a rate that is higher than the first rate, the system heat pump can be operated to deliver more thermal energy to the thermal storage reservoir during times when the rate being charged for the energy to the premises is being billed at the first rate than the thermal energy delivered by the system heat pump to the thermal storage reservoir when the rate being charged for the energy to the premises is being billed at the second rate, In addition, the system heat pump can also be operated to remove more thermal energy from the thermal storage reservoir during times when the rate being charged for the energy to the premises is being billed at the first rate than the thermal energy removed from the thermal storage reservoir when the rate being charged for the energy to the premises is being billed at the second rate.

As a further aspect of an embodiment, the system heat pump can be operated to deliver energy to the thermal storage reservoir based at least in part upon a temperature forecast for the area in which the premises is located. For example, the system heat pump can be operated to deliver energy to the thermal storage reservoir during one or more time intervals of a time block when the forecasted temperature is higher than the forecasted temperature for other time intervals of the time block. In addition, the system heat pump can also be operated based at least in part upon the temperature forecast to remove energy from the thermal storage reservoir during one or more time intervals of a time block when the forecasted temperature is lower than the forecasted temperature for other time intervals of the time block.

As a further aspect of embodiments, the system heat pump is desirably operable in one or more modes, such as a plurality of modes, in response to control signals and/or forecasts of various type of information such as price and/or weather.

One mode can comprise a power sink mode during which system heat pumps of a plurality of the energy storage systems are operated to deliver thermal energy to the thermal storage reservoirs to thereby sink a quantity of energy from the electrical grid by storing the quantity of energy as thermal energy in the thermal storage reservoirs. Another mode can comprise a remote override mode, wherein system heat pumps of plural energy storage systems are instructed to operate at power levels designated by the instructions, the system heat pumps being variable speed heat pumps responsive to the instructions to operate at the designated energy levels.

A further one of said modes can comprise a minimize energy use during specified time period mode, wherein one or more time periods are specified during which energy use is to be minimized, the system heat pump being operated a greater amount of time outside the specified time periods to store thermal energy in or remove thermal energy from the thermal storage reservoirs outside of the specified time periods, the premises heat pump removing thermal energy from or delivering thermal energy to the premises at least in part during the specified time periods to thereby reduce the electrical energy required to be provided from the electrical grid to the premises heat pump during the specified time periods.

Yet another of said modes can comprise a minimize total energy use mode, wherein based at least in part upon a temperature forecast, the system heat pump for the premises is operated to store thermal energy in the thermal storage reservoirs a greater amount of time during one or more time intervals of a time block when forecasted temperatures are higher than the forecasted temperatures for other time intervals of the time block, and wherein based at least in part upon a temperature forecast, the system heat pump for the premises is operated to remove thermal energy from the thermal storage reservoir a greater amount of time during one or more time intervals of a time block when forecasted temperatures are lower than the forecasted temperatures for other time intervals of the time block.

A still further one of said modes can comprise a minimize carbon footprint mode, wherein the system heat pump is operated based in part upon a forecast of carbon per kWh generated by power sources providing electrical energy to the electrical grid to store a greater amount of energy in the thermal storage reservoir at times when carbon production from the power sources is forecast to be at a first level than the amount of energy stored in the thermal storage reservoir at times when carbon production of such power sources is forecast to be at a second level that is greater than the first level, and wherein the system heat pump is operated based in part upon a forecast of carbon generated by power sources providing electrical energy to the electrical grid to remove a greater amount of energy from the thermal storage reservoir at times when carbon production from the power sources is forecast to be at a first level than the amount of energy removed from the thermal storage reservoir at times when carbon production of such power sources is forecast to be at a second level that is greater than the first level.

Yet another of said modes can comprise a minimize customer premises bill mode when rates charged to the premises for electrical energy vary, wherein during such mode a system heat pump at the premises is operated a greater amount of time during time periods when the energy rate being billed to the premises are at a first rate and is operated a lesser amount of time during time periods when the energy rate being billed to the premises is at a second rate that is higher than the first rate. As a more specific example of this mode, the system heat pump at the premises is not operated to deliver energy to the thermal storage reservoir at times when the electrical energy provided to the premises is billed at the second rate.

As a still further mode, one of said modes can comprise a minimize utility cost mode based on a forecast of utility marginal power production costs, wherein during such mode the system heat pump is operated a greater amount of time during time periods when the marginal energy production cost to the utility are at a first cost and is operated a lesser amount of time during time periods when the marginal energy production cost is at a second rate that is higher than the first rate.

Another mode can comprise a manual control mode, wherein in response to a control instruction, the system heat pump for the energy storage system at the premises is operated at a specified level of operation, the system heat pump at the premises being a variable speed heat pump.

A further mode can comprise a default mode, wherein the system heat pump for the premises is operated to maintain a constant temperature of liquid in the thermal storage reservoir, the constant temperature being within a range of a desired premises temperature.

Yet another mode can comprise a recovery from power outage mode wherein, following a power outage, the system heat pump (and/or plural system heat pumps at plural locations) that suffered the power outage is (or are in the case of plural system heat pumps) operated at a controlled ramp up rate to deliver energy to the thermal storage reservoir of the energy storage system that suffered the power outage (or plural thermal storage reservoirs if there are plural system heat pumps associated with different thermal storage reservoirs).

The system heat pump is typically controlled in most modes by a controller at the premises. Billing data, weather forecast data, power production cost data and other data and instructions for the respective control modes can be delivered by a communications link, such as wirelessly or by a hard wired link, to the premises controller.

The system heat pump can also be operated in a plurality of modes, although more typically one mode is selected and used until the next mode is selected. In one example of a plural mode operation, a first said modes can comprise a recovery from power outage mode wherein following a power outage the system heat pumps at plural locations that suffered the power outage are operated at a controlled ramp up rate to deliver energy to the thermal storage reservoirs of the energy storage systems that suffered the power outage. In addition, second mode of the plural mode example can comprise a remote override mode, wherein system heat pumps of plural energy storage systems are instructed to operate at energy levels designated by the instructions, the system heat pumps being variable speed heat pumps responsive to the instructions to operate at the designated energy levels. A third mode of this plural mode example can comprise a minimize energy use during specified time period mode, wherein one or more time periods are specified during which energy use is to be minimized, the system heat pump being operated a greater amount of time outside the specified time periods to store thermal energy in or remove thermal energy from the thermal storage reservoirs outside of the specified time periods, the premises heat pump removing thermal energy from or delivering thermal energy to the premises at least in part during the specified time periods to thereby reduce the electrical energy required to be provided from the electrical grid to the premises heat pump during the specified time periods. In addition, a fourth mode of the plural mode example can comprise a minimize utility cost mode based on a forecast of utility marginal power production costs, wherein during such mode the system heat pump is operated a greater amount of time during time periods when the marginal energy production cost to the utility are at a first cost and is operated a lesser amount of time during time periods when the marginal energy production cost is at a second rate that is higher than the first rate.

In addition to a system comprised of plural energy storage systems comprising a respective system and premises heat pumps and associated storage, the inventive aspects of this disclosure include the novel and non-obvious aspects of individual energy storage systems. Thus, in an embodiment, a system for storing energy from an electrical grid comprises: a thermal storage reservoir at the location for containing liquid that can be heated or cooled to respectively add energy to or remove energy from the thermal storage reservoir; a system heat pump coupled to the electrical grid to receive electrical energy from the grid to power the system heat pump, the system heat pump being operable to convert electrical energy from the grid to thermal energy, the system heat pump being coupled to the thermal storage reservoir and operable to perform at least one of: (a) delivering thermal energy to the thermal storage reservoir to heat the liquid in the thermal storage reservoir, and (b) removing thermal energy from the thermal storage reservoir to cool the liquid in the thermal storage reservoir; and a premises heat pump coupled to the electrical grid to receive electrical energy from the electrical grid to power the premises heat pump, the premises heat pump being coupled to the thermal storage reservoir and operable to perform at least one of: (a) removing thermal energy from the thermal storage reservoir for delivery to the premises at the location to provide heat to the premises, and (b) removing thermal energy from the premises for delivery to the thermal storage reservoir to provide cooling for the premises. The thermal storage reservoir can comprise one or more liquid storage tanks for receiving thermal energy storage liquid such as water. The tanks can be separated compartments of a storage vessel. The flow of liquid between the tanks can be controlled to control the temperature (e.g. the average temperature) of liquid in the tanks.

The energy storage system can be controlled in accordance with one or more of the control modes described above. For example, one or more modes of operation can be selected from the above modes with the system being operated in response to control signals to carry out the respective modes. The control signals can be delivered from a premises controller comprising a processor and memory, with the processor programmed to carry out the respective control modes as described herein. The premises heat pump (s) and system heat pump are responsive to the control signals to operate to carry out the mode of operation. Thus, for example, the individual energy storage systems can be instructed to operate in a selected one or more of the following above described modes: a minimize energy use during specified time period mode; a minimize energy use during specified time period mode; a minimize carbon footprint mode; a minimize customer premises bill mode when rates charged to the premises for electrical energy vary (such as not operating the system heat pump when a high or highest electrical energy rate applies); a default mode, wherein the system heat pump for the premises is operated to maintain a constant temperature of liquid in the thermal storage reservoir, the constant temperature being within a range of a desired premises temperature; a manual control mode, wherein in response to a control instruction, the system heat pump for the energy storage system at the premises is operated at a specified level of operation, the system heat pump at the premises being a variable speed heat pump; or a default mode, wherein the system heat pump for the premises is operated to maintain a constant temperature of liquid in the thermal storage reservoir, the constant temperature being within a range of a desired premises temperature.

As an aspect of an energy storage system, the premises heat pump can be operated to remove thermal energy from or deliver thermal energy to the thermal reservoir independently of whether the system heat pump is delivering thermal energy to or removing thermal energy from the thermal storage reservoir.

As another aspect of an energy storage system, the system heat pump can be operable to deliver thermal energy to the thermal storage reservoir and the premises heat pump can be operable to remove heat from the thermal storage reservoir for delivery to the premises to heat the premises. In addition, the system heat pump can be operable to remove thermal energy from the thermal storage reservoir to cool the thermal storage reservoir and the premises heat pump can be operable to remove thermal energy from the premises for delivery to the thermal storage reservoir to provide cooling for the premises. Also, in accordance with an aspect of an embodiment, the system heat pump can be operable to both deliver thermal energy to and remove thermal energy from the thermal storage reservoir and wherein at least one premises heat pump at the premises can be operable to both deliver thermal energy to and remove thermal energy from the premises.

As a further aspect of an energy storage system, the premises heat pump can be operable to remove thermal energy from the thermal reservoir independently of whether the system heat pump is delivering thermal energy to the thermal storage reservoir. Also, the system heat pump can be operable to deliver thermal energy to the thermal storage reservoir independently of whether the premises heat pump is removing heat from the thermal storage reservoir.

As a further aspect, the energy storage system can comprise a first electricity meter for measuring electrical energy delivered from the electrical grid to the premises, wherein different rates are billed for electric energy delivered from the electrical grid to the premises heat pump, one of such rates being a highest billed rate, and wherein at least some heat is removed from the thermal storage reservoir by the premises heat pump for delivery as heat to the premises at times when the billed rate for power used at the premises is at the highest billed rate.

The energy storage system can also comprise a hot water heat pump coupled to the electrical grid to receive electrical energy from the electrical grid, the hot water heat pump being coupled to the thermal storage reservoir and operable to remove thermal energy from the thermal storage reservoir for delivery to the premises to provide heat for heating water at the premises. Desirably, the hot water heat pump is operable to remove thermal energy from the thermal storage reservoir independently of whether the system heat pump is delivering thermal energy to the thermal storage reservoir, and the system heat pump is operable to deliver thermal energy to the thermal storage reservoir independently of whether the hot water heat pump is removing heat from the thermal storage reservoir.

The energy storage system can further comprise a first electricity meter operable to measure electrical energy delivered from the electrical grid to the premises and a second meter operable to measure at least one of the thermal energy delivered from the system heat pump to the thermal storage reservoir or removed from the thermal storage reservoir by the system heat pump, wherein the second meter is a Btu meter at or downstream from the output of the system heat pump.

In accordance with another aspect of an energy storage system, energy usage at the premises can be is estimated for a time block, the estimated energy usage for the premises for the time block being updated for first time intervals that are of a shorter duration than the time block, actual energy usage being computed at second time intervals shorter than the first time intervals and being used to update the estimated energy usage for the time block, the system heat pump being operated to deliver energy to the thermal storage reservoir based at least in part on the estimated energy usage at the premises.

In accordance with another aspect of an energy storage system, wherein energy from the electrical grid to the premises is billed at least at first and second rates, the second rate being a higher rate that is higher than the first rate, the system heat pump can be operated to deliver more thermal energy to the thermal storage reservoir and to remove more energy from the thermal storage reservoir during times when the rate being charged for the energy to the premises is being billed at the first rate than during times when the rate being charged for the energy to the premises is being billed at the second rate.

As a further aspect of an energy storage system, the system heat pump can be operated to deliver energy to and to remove energy from the thermal storage reservoir based at least in part upon a temperature forecast for the area in which the premises is located. For example, the system heat pump can be operated to deliver energy to the thermal storage reservoir during one or more time intervals of a time block when the forecasted temperature is higher than the forecasted temperature for other time intervals of the time block, and wherein the system heat pump can be operated to remove energy from the thermal storage reservoir during one or more time intervals of a time block when the forecasted temperature is lower than the forecasted temperature for other time intervals of the time block.

The disclosure also encompasses new and non-obvious aspects of an energy storage method.

In accordance with one embodiment of a method, a method of storing energy from an electrical grid in thermal storage reservoirs at a plurality of discrete locations comprises: operating a system heat pump at a first location to transfer energy from the electrical grid to a thermal storage reservoir location and to remove thermal energy from the thermal storage reservoir; and operating a premises heat pump at the first location independently of whether the system heat pump is transferring energy to or removing thermal energy from the thermal storage reservoir to transfer thermal energy from the thermal storage reservoir for delivery to the premises at the location to provide heat to the premises and to remove thermal energy from the premises for delivery to the thermal storage reservoir to cool the premises.

As a further aspect of a method embodiment, the method can comprise: measuring electrical energy delivered from the electrical grid to the premises, wherein different rates are billed for electric energy delivered from the electrical grid to the premises, one of such rates being a highest billed rate, and removing at least some heat from the thermal storage reservoir by the premises heat pump for delivery to the premises at times when the billed rate for power used at the premises is at the highest billed rate and removing at least some heat from the premises by the premises heat pump for delivery to the thermal storage reservoir when the billed rate for power used at the premise is at the highest billed rate.

As another aspect of a method embodiment, the method can comprise: operating plural system heat pumps, the heat pumps being located at different locations, to deliver heat to an associated thermal storage reservoir at the location of each of the system heat pumps during at least some of the time when wind or solar energy sources coupled to the electrical grid in combination with other power generating sources coupled to the electrical grid are producing more power than the electrical demand on the grid or are producing more power than forecasted.

As yet another aspect of a method embodiment, a method can comprise: estimating the energy usage at the premises for a time block, updating the estimated energy usage for the premises for the time block at first time intervals that are of a shorter duration than the time block, determining actual energy usage at second time intervals shorter than the first time intervals and updating the estimated energy usage for the first time intervals based upon the actual energy usage, the system heat pump being operated to deliver energy to the thermal storage reservoir based at least in part on the estimated energy usage for the premises.

As a still further aspect of a method embodiment, the method can comprise: operating the system heat pump to deliver thermal energy to the thermal storage reservoir during a time period when the forecasted temperature is higher than the forecasted temperature for other time periods. These and other inventive aspects of this disclosure will become more apparent from the following description and drawings. It is to be understood that the embodiments disclosed herein are exemplary embodiments that do not limit the scope of this disclosure. The invention encompasses all novel and non-obvious combination and sub-combinations of elements and method acts disclosed herein.

DETAILED DESCRIPTION

Figure 1:
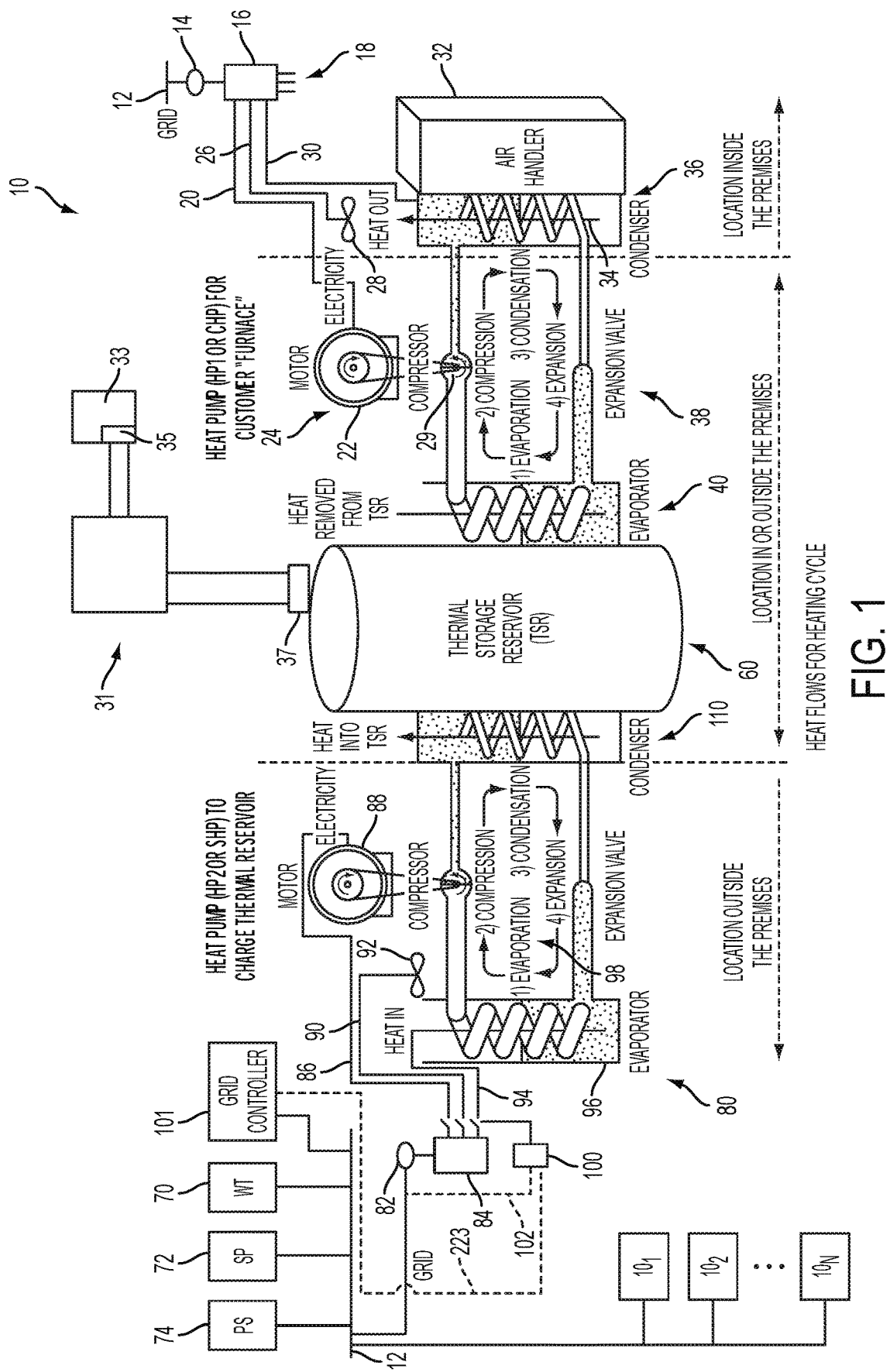
FIG. 1 is a schematic illustration of an electricity grid with variable electric energy generating sources coupled to the grid, together with exemplary plural heat pump energy storage systems located in or outside premises of electric energy consumer, with the energy storage system being shown in a heating cycle mode of operation.

With reference to FIG. 1, an exemplary thermal or energy storage system 10 utilizing plural independently operated heat pumps is illustrated. Additional energy storage systems for premises at other discrete locations are indicated at $10_1$, $10_2$, ... $10_N$. In this case N is an arbitrary number and can be in the thousands, hundred thousands or higher. A single energy storage system can also service a plurality of premises. Electrical energy from an electrical grid passes through a user's meter 14 to an electrical panel 16 that has multiple circuits, controlled by circuit breakers, fed by the panel 16. These circuits can comprise a circuit 20 for providing power to a compressor 22 of a first premises heat pump 24 (HP1), a circuit 26 for providing power to a fan 28 comprising a portion of an air handler of a premises heat pump system and a circuit 30 for providing power to heating elements, such as resistance heaters, included in an air handling unit 32 of the premises heat pump heating system. The heat pump HP1 can also be referred to as a premises heat pump and/or a consumer (referring to a user of electricity) heat pump (CHP). A heat transfer fluid such as air 34 passing through the air handler 32 picks up heat (in a heating cycle) from a heat exchanger portion 36 of heat pump system 24 and also from the resistance heaters if they are providing heat. The heat pump system 24 can be operated by a conventional heat pump control/thermostat control system. The heat pump operates in a conventional manner to perform steps indicated at 38 (evaporation, compression, condensation and expansion). Up to this point the description of heat pump system 24 is of a conventional heat pump used, for example, in a residential or commercial establishment or premises.

In accordance with this disclosure, one or more thermal storage reservoirs, such as storage vessels or tanks, such as indicated at 60, are added to or adjacent to an electricity user's premises, typically inside the premises. However, the thermal storage vessel can be outside of the premises, such as in an insulated housing or underground. The thermal storage reservoir 60 acts as a heat source or heat sink for heat pump system 24, or to a plurality of such premises heat pumps if the user's premises has more than one heat pump. The heat pump 24 can be provided to meet the customer's hot water, space and/or cooling needs. In FIG. 1, a second consumer heat pump (CHP2) is included and indicated at 31. This heat pump 31 can be used, for example, to heat water in a water heater tank 33 and hence can be designated as a hot water heat pump (HWHP). Heat pump 31 can operate like heat pump 24, but is typically of a smaller capacity. The heat pump 31 is coupled to a water tank heat exchanger 35 and to a thermal storage reservoir heat exchanger 37 positioned within reservoir 60. Alternatively the heat exchanger 37 can be co-located with the heat pump 31 and the working fluid of the storage tanks 60 can be pumped to the location of heat pump 31. The term and/or in this disclosure means "and", "or" and both "and" and "or". If and/or is used in connection with a list of more than two items, and/or also includes all of the items individually, alternately, and also all possible combinations of items from the list. The thermal storage reservoir 60 can comprise a modular vessel having three or more, for example three to five, containers such as separate tanks or compartments for storing the heat (or cold, or both) retaining material. The heat retaining material can, for example, be water, with or without added substances such as salt, or another liquid. An exemplary thermal storage vessel can be sized to hold 5,000 to 8,000 pounds of water, for example, and would, in this case, can be contained in four modular tanks within an insulated volume of about 4 feet wide, by 10 feet long, and by 8 feet high in dimensions (rectangular); these dimensions including insulation from external temperatures. At specific premises the size of the reservoir can be economically sized to meet customer heating and cooling demand and grid storage interests. The reservoir can be built into a wall of a house, installed at a basement location or installed outside the premises, such as underground. Heat can be removed from the thermal storage reservoir during a heating cycle, such as using a heat exchanger 40 in thermal communication with the fluid in the thermal reservoir 60. The thermal storage reservoir can also be used as a heat sink during a cooling application.

As previously mentioned, power is supplied to the electrical grid from any one or more of a number of types of power generating sources. In FIG. 1, wind turbines are indicated at 70, solar panels are indicated at 72 and other power sources (e.g., coal and/or gas fired power plants, hydroelectric dams, nuclear plants, etc.) are indicated at 74. Some of these power sources provide or output highly variable quantities of power. For example, wind turbines are highly wind dependent with more power being available from wind turbines if a strong wind is blowing than if no wind or a gentle breeze is blowing. In addition, power from solar panels is dependent upon the amount of sunlight received by the panels. It is possible for the power available from these sources to exceed the demand or electrical load on the grid. In periods such as this, unless a mechanism is provided to store the excess energy, power sources are typically taken off line under excess power generating conditions to balance the power on the grid with the load. Consequently, energy that otherwise would be available is lost. For example, wind turbines may be stopped or decoupled from the grid and solar panels can be decoupled from the grid under such conditions. As a specific example, assume that power from the available sources varies from that which is expected or forecast and energy production also varies. Using, for example, a remote control mode discussed below, a system heat pump (as explained below) can be instructed by a utility controller to operate, in response to a received instruction, at 2 kW at times when the wind power is at the expected level, at 1 kW when wind power production temporarily falls below the forecast level, and at 3 kW when wind production goes above the expected or forecast power level or the wind blows longer than an expected end time. Consequently, excess power is captured in a thermal storage reservoir due to the operation of the system heat pump at a higher level when power production exceeds a forecast level.

In accordance with this disclosure, thermal storage reservoirs such as 60 at or adjacent to power user's premises comprise a desirable approach for storing the excess power in the form of thermal energy for use at a later time to meet power demands. For example, the stored power can be made available from the thermal reservoir during peak times to smooth out the peak electrical power demand and provide a commercial benefit to consumers by obtaining energy from the storage reservoir at such peak times instead of from the grid. In one desirable approach, the temperature of the thermal storage reservoir is desirably controlled by a third party, such as by a utility company, independently of the customer who is using the thermal storage reservoir as a heat sink to effect cooling or as a heat source to effect heating of the customer's premises.

With further reference to FIG. 1, in the illustrated system, one or more systems or electric grid connected system heat pump 80 is included. In the figures, such as FIG. 1, this system heat pump is referred to as HP2 or SHP. Energy from the grid 12 is fed via a meter 82 to an electrical panel 84 and via circuit breakers and switches to components of the system heat pump 80. For example, a circuit 86 is coupled to a motor running a compressor 88 of the system heat pump 80, a circuit 90 is coupled to a fan 92 of an air handler portion of the system heat pump and a circuit 94 is coupled to auxiliary heating strips, such as resistance heaters, included in a heat exchanger 96 of the system heat pump 80. System heat pump 80 performs the conventional steps of evaporation, compression, condensation and expansion as indicated by the number 98 in FIG. 1. The system heat pump 80 is located outside of the premises of the energy consumer. The compressor 88, of the system heat pump, can be driven by a variable speed motor, with this capability and a suitable control system as described below, the system operator of a medium-sized utility with a million residential customers will be able to vary load, increase or decrease, by approximately 200 MW with only ten percent of the customers employing an energy storage system 10. Again, multiple energy storage systems like system 10 at different locations are indicated by the systems $10_1, 10_2, \ldots 10_N$ in FIG. 1. N can be any number of these systems. Using an available technology, such as FM RDS (FM Radio Data System) as one embodiment of a communications control method, electrical grid system operators will be able to execute this magnitude of change in less than ten seconds, in response to, for example, a wind surge.

The system heat pump 80 can have a greater capacity than the premises heat pump 24. In such an example, at night during a heating cycle, there can be a net gain in stored energy as thermal energy can be stored at a higher rate than it is being drawn down by the premises heat pump for use during a peak demand time, such as during the day.

Figure 2:
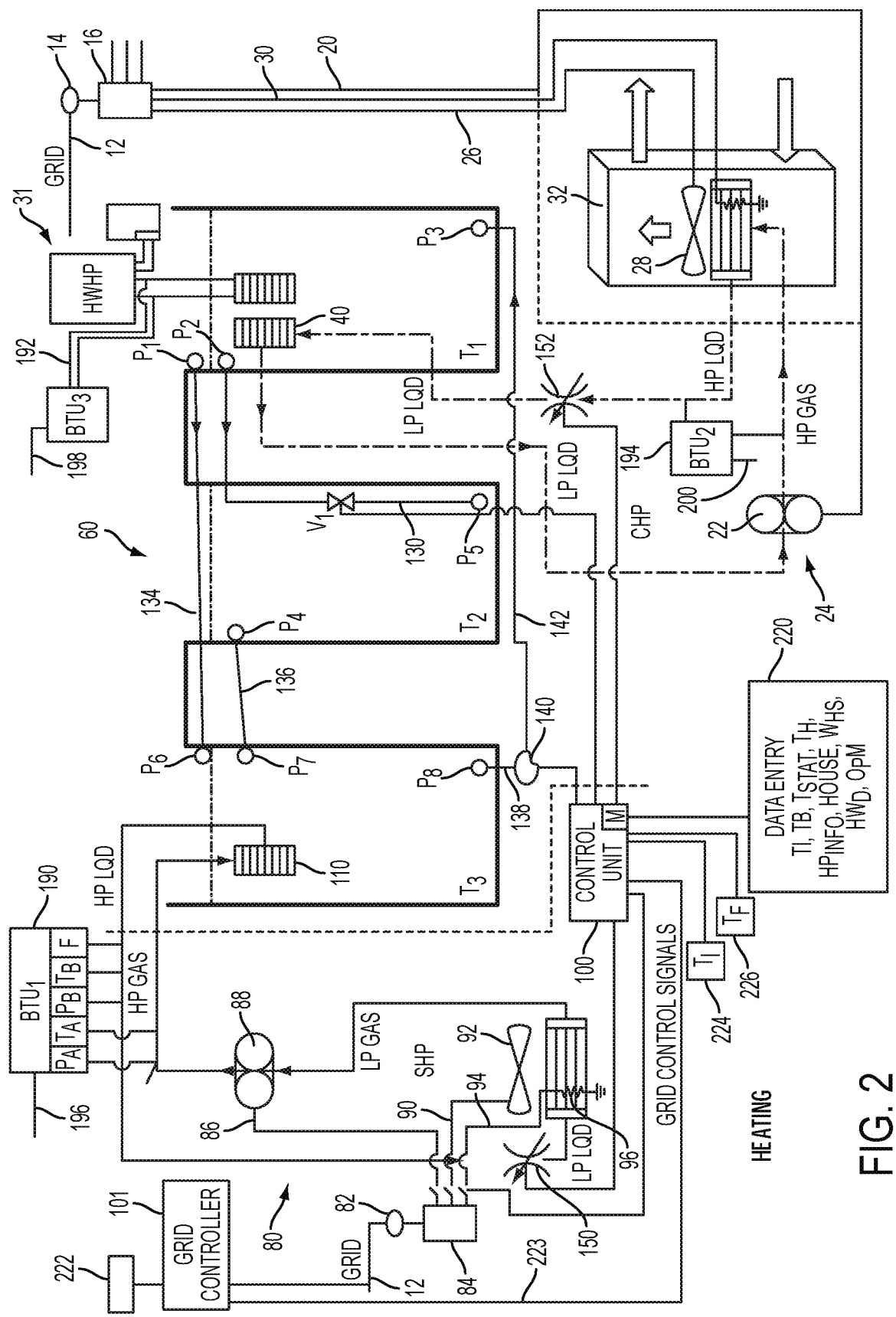
FIG. 2 is a more detailed illustration of an embodiment like that shown in FIG. 1 with a thermal storage reservoir comprising a plurality of energy storage tanks for storing energy for later use.

A controller 100, which can be responsive to control signals from a grid controller 101 via a conventional communications link, which can be hardwired or wireless, via a control input line 102, line 102 also being capable of transmitting data and feedback signals delivered via the communications link to the overall system or grid controller 101, is provided for controlling the system heat pump 80. This controller 100 can also control storage of energy in and withdrawal or removal of energy from the thermal storage reservoir. Feedback from sensors and actuators, such as some located in the reservoir 60, can be used by controller 100 as part of the overall system control for a plural dual heat pump system such as shown in FIGS. 1 and 2 to ensure customer demands are met while optimizing the overall grid storage capability. To be clear, for every premises a system controller 100 is desirably operable to operate the premises dual heat pump energy storage system autonomously, whether communication with the grid controller exists or not. The grid controller 101 is desirably operable to update the system controller with information that improves the efficacy of the various modes of operation (such as described below, e.g., updated weather forecast, updated electric price forecast, and/or direction to changes operation modes). Only in the remote mode will the system heat pump typically be directed by the grid controller 101 to change power levels, but even then the premises system controller 100 desirably ensures that appropriate operation occurs in the customer's interest. For example, if the customer is away on vacation the system heat pump can be restricted to respond only in a very limited ways.

At desirable times, such as when high quantities of wind power and/or solar power are being generated during wintertime, the system heat pump 80 can be controlled to operate to use this available power to add heat to (in a heating mode) or extract heat from (in a cooling mode) the thermal reservoir via a heat exchanger 110 in thermal communication with the heat storage media of the thermal storage reservoir. In addition, the system heat pump 80 can be operated during off peak grid power demand times to store heat in (or cool liquid in) reservoir 60 during such times for use at a later time. With this basic approach, integration of wind power and solar power sources into an electrical grid is facilitated because excess energy from these variable sources can be stored as thermal energy. It should be noted that a multiplicity of systems as shown in FIG. 1 can be included at respective multiple premises throughout the grid. With the resulting capacity of being able to convert excess energy into thermal energy that is stored for later use, the utility can save money as, for example, it can reduce the power generation needed to meet demand because the maximum peak power demand would be reduced because of the supplement that is available from the thermal storage reservoirs. In addition, energy costs to the consumer can be reduced as the thermal storage reservoir can be used to provide heat during peak power times when power costs would be higher in the case of a heating cycle or for cooling the premises during such times in the case of a cooling cycle.

Although FIGS. 1-5 show the system 10 utilizing the heat pump working fluid as the heat transfer media, it is within the scope of this disclosure to alternatively use the energy storage liquid in the thermal storage tank as a heat transfer liquid. In such a case, the energy storage liquid is circulated to heat exchangers used to heat/cool the user's premises and to heat hot water. If the thermal storage reservoir liquid is used as the working heat transfer liquid, then the refrigerant (heat pump working fluid) to tank fluid heat exchanger can be desirably located at the heat pump, instead of in or near the tank.

It should be noted that the electrical panels 16, 84 can be combined and a single meter can be used instead of two separate meters, if desired for a specific application.

The controller 100 can be operated to control the temperature of liquid in the thermal storage reservoir and also the operation of system heat pump 80 independently of heating and cooling demands by the user. Thus, for example, the system heat pump 80 can be operated to increase or decrease the amount of stored energy available from the vessel 60 to meet the amount of energy required by the premises heat pump 24 to thereby meet user demands, while still storing thermal energy in the vessel/reservoir. This system allows the electric grid operator to determine the most efficient times to provide power to the customer (for storage as thermal energy to meet, for example, heating or cooling needs at the user's premises), independently, of the time the customer chooses to use electric power by drawing on the thermal storage reservoir. Consequently, heating and cooling can be accomplished in a manner that maximizes comfort and lifestyle choices at the premises. The thermal storage approach of this disclosure constitutes a desirable method of achieving optimal thermal storage and power usage as independent outcomes. Thermal storage is believed to be a much less costly approach (perhaps a tenth of the cost) for storing energy from variable energy sources than battery storage, the approach being considered in the electric industry today. Heat pump technology today, is already the most efficient and environmentally benign way to deliver heating needs to the premises; this system optimizes both desirable outcomes.

FIG. 2 is an expanded view of FIG. 1. Like components in FIG. 2 have been assigned the same numbers as in FIG. 1 and will not be discussed in detail. In FIG. 2, the vessel 60 is shown subdivided into 3 tanks labeled T1, T2 and T3, which can be interconnected by plumbing conduits to carry liquid between the tanks. Although alternative plumbing configurations can be used and can be more economical in a specific application, in the embodiment of FIG. 2, tank T1 has outlet ports P1 and P2 and an inlet port P3; tank T2 has an inlet port P5 connected by a pipe or conduit 130 to the outlet port P2. A valve V1 can be operated to close off pipe 130 in response to a signal from control unit 100. Tank T2 also has an outlet port P4. Tank T3 has an inlet port P6 connected by a pipe or conduit 134 to the outlet port P1. Tank T3 also has another inlet port P7 connected by a pipe or conduit 136 to the outlet port P4 of tank T2. In addition, tank T3 has an outlet port P8 connected by a conduit 138 to a pump 140 that can be operated in response to control signals from the control unit 100. A pipe or conduit 142 connects the outflow of the pump 140 to the inlet P3 of tank T1. In this embodiment, the elevation of outlet port P1 is desirably greater than the elevation of outlet port P2; the elevation of inlet port P6 is desirably less than the elevation of outlet port P1; the elevation of port P6 is desirably higher than the elevation of port P7 and the elevation of port P7 is desirably less than the elevation of port P4. In the embodiment of FIG. 2, the tanks desirably can be operated at atmospheric pressure, to minimize cost. This approach allows the use of a single pump to control the water flow in all of the thermal storage tanks. Additional tanks can be added (e.g., a fourth, fifth, and or additional tanks) to the thermal storage system. These additional tanks can be added, for example, in the flow path between (and can be positioned between) tanks T2 and T3. In this case, the P1 to P6 connection can still extend between the first tank T1 and last tank T3 (e.g., tank T3 can become the last tank), such as shown in FIG. 2. The additional tanks (e.g., tank T4) can have plumbing such as shown for T2 in FIG. 2, but without the valve V1. Thus, water will flow from the top of tank T2 to the bottom of tank T4 instead from the top of tank T2 to the top of tank T3 and water from the top of tank T4 will flow to the top of tank T3. If a fifth tank T5 is added, it can be positioned between tanks T4 and T3 and the plumbing can be as described for tank T4 except that tank T4 feeds into tank T5 and tank T5 feeds into tank T3. Additional tanks can be added in the same manner.

In a heating cycle, heat is added to tank T3 via heat exchanger 110. Liquid is pumped by pump 140 from port P8 through conduit 142 into port P3. Thus, colder fluid is being drawn from the lower portion of tank T3 and being introduced into tank T1. During a heat charging operation, the valve V1 is open. As a result, as fluid is pumped into tank T1 and the liquid in tank T1 reaches the elevation of port P2, the liquid flows through conduit 130 and port P5 into tank T2. In addition, liquid is also flowing from port P4 through conduit 136 to port P7 and back to the tank T3. This liquid cycling can be continued during heat charging until all of the tanks T1, T2 and T3 are at the high temperature level, such as at the same temperature level with 100 degrees Fahrenheit being one specific example. With proper engineering, pump 140 need not be a high wattage pump due to similar elevation head. A variable speed pump can be used. In one example of a four tank system containing 8000 lbs. or 960 gallons of water, a pump operating at a low flow rate of 2.5 gallons per minute can fully circulate the water through the tanks in less than six hours.

Assume that heat is being removed from the tanks via the heat pump system 24 and heat exchanger 40. One can selectively close the valve V1. In this case, instead of liquid passing from port P2 to port P5 the liquid level in tank T1 will rise until it passes from port P1 to port P6 bypassing the tank T2. As a result, the temperature in T2 will remain high (if it has been charged with heat) or low, if it has been charged with colder fluid during a cooling charging cycle. At a later time, such as during a peak energy cost or demand time, valve V1 can be reopened so that heat stored in tank T2 is now available for extraction. Control unit 100 can also control the operation of expansion valve 150 in the circuit of heat pump 80. Valve 152 is controlled by the controller of heat pump 24 in a conventional manner. Control unit 100 can be responsive to signals from the grid to operate heat pump 80 and provide power to auxiliary heating units 96 when, for example, excess wind power, for example, would be available on the grid. Although a system at a single residence would not make much of a difference to the overall electrical grid operation, the provision of a multiplicity of such units at many premises can have a significant impact on overall grid operation.

It should be noted that in FIG. 2, LP LQD refers to low pressure liquid, HP gas refers to high pressure gas, HP LQD refers to high pressure liquid, and LP gas refers to low pressure gas, i.e., the states of the working fluid in a conventional heat pump system.

Figure 3:
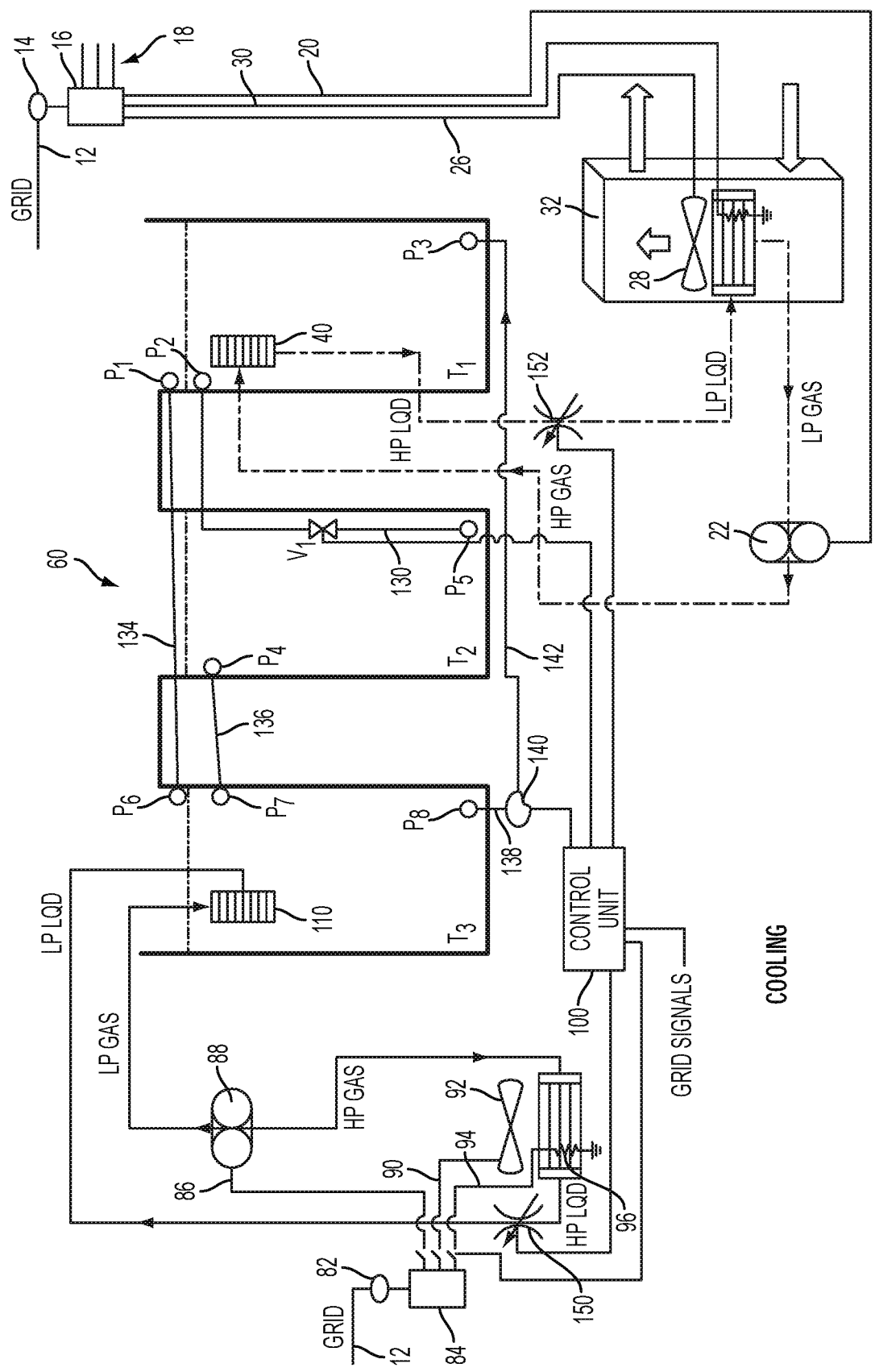
FIG. 3 is a schematic illustration of a system like that shown in FIG. 2, but shown operational for cooling and without a hot water heat pump and without some of the control sensors and exemplary controller shown in FIG. 2.

FIG. 3 is like FIG. 2 except showing the illustrated system being operated in a cooling mode. In the example of FIG. 3, since these components have been assigned the same numbers as in FIG. 2, they will not be described in detail. In FIG. 3, the system is being operated to cool the liquid in the tanks T1, T2 and T3. Note that, per conventional designs, the direction of flow of the heat pump working fluids is reversed.

Figure 4:
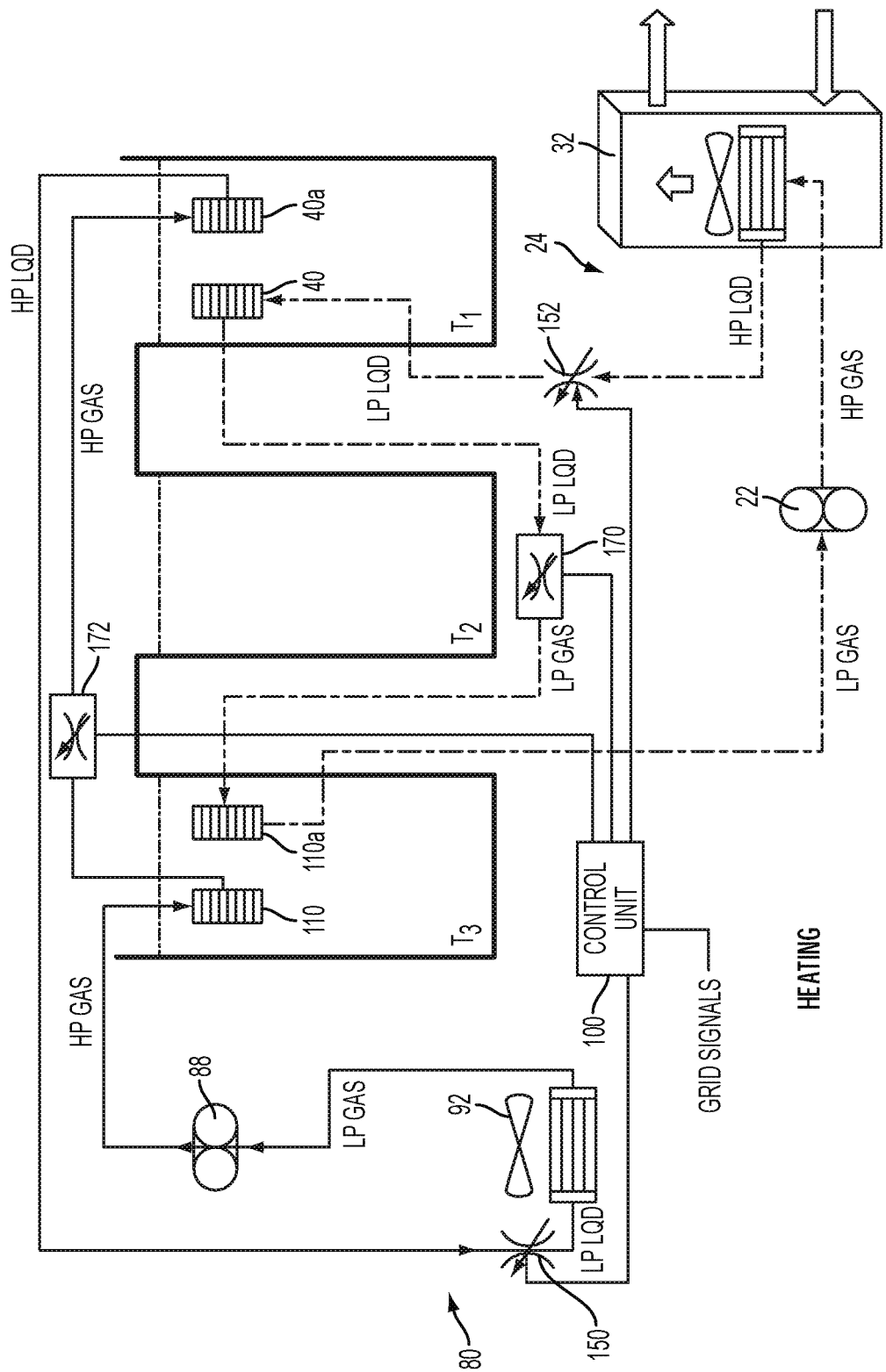
FIG. 4 is an alternative embodiment to that shown in FIG. 2 in a heating mode.
Figure 5:
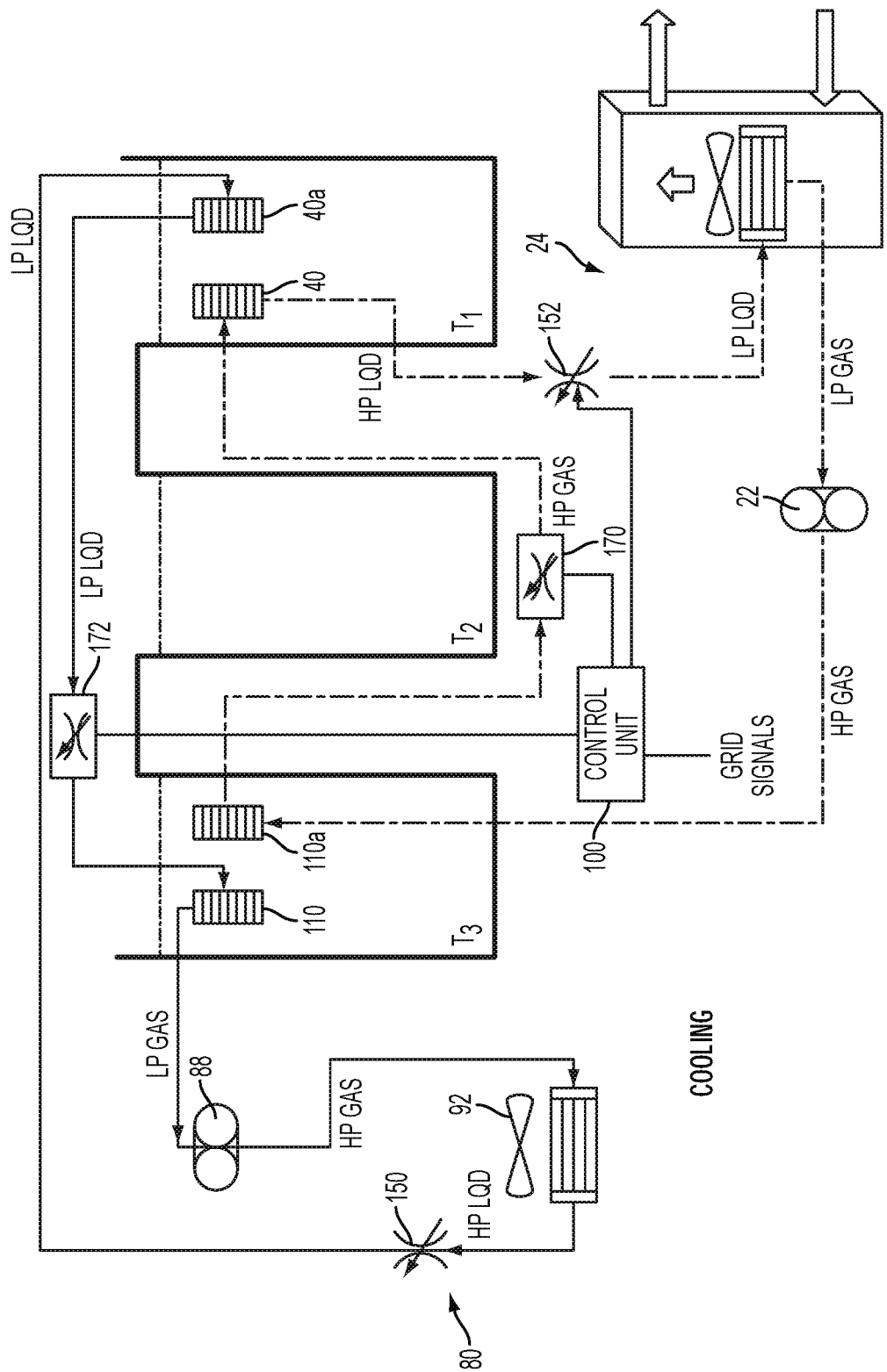
FIG. 5 is an embodiment like that shown in FIG. 4 in a cooling mode.

The embodiment of FIGS. 4 and 5 illustrate respective heating and cooling cycles but with plumbing components such as shown in FIGS. 2 and 3 not shown for convenience. In addition, the electrical connections to the grid are also not shown for convenience. To improve the efficiency of the overall system, plural heat exchangers have been included in each of the tanks T1 and T3. In this case, heat exchanger 40a in tank T1 has been included and is part of the circuit for grid system heat pump 80. In addition, heat exchanger 110a has been added to tank T3 and is part of the circuit for premises heat pump 24. In addition, an added expansion valve 172 has been included in the circuit for heat pump 80 and an added expansion valve 170 has been included in the circuit for heat pump 24. In the heating cycle, the HP gas pressure across expansion valve 172 is reduced to a lower high pressure level across the valve. In contrast, in the cooling mode, the low pressure liquid expands to a low pressure gas across valve 172. In addition, the low pressure liquid expands to a low pressure gas across valve 170, and in a cooling cycle the pressure of the high pressure gas is reduced across the valve 170.

By including plural heat exchangers in the tanks T1 and T3, greater efficiencies of operation of the system in both heat extraction and cooling modes can be achieved.

Monitoring of energy flows is desirable for use in optimizing the performance of the system. One exemplary tool that can be used in the system is frequently referred to a "Btu meter." Btu meters are commercially available. A basic method (when no phase change occurs) for measuring energy conveyed to/from a device is to measure, repeating at short time intervals, mass flow rate into or out-of the device and the temperature difference between the inlet and outlet of the device. Using basic thermodynamic principles the energy flow rate as a function of time can be determined in a conventional manner. A Btu meter can also be developed where refrigerant is used for heat conveyance, but because of the phase change, a pressure sensor is also used at the inlet and outlet of the heat pump to enable the calculations, which are accomplished in a conventional manner. One downside of using tank fluid for thermal conveyance is that fluid flow rates to, and among tanks, will be considerably higher With reference to FIG. 2, three exemplary Btu meters 190, 192 and 194 are shown. In this case, Btu meter 190 is associated with system heat pump 80, Btu meter 192 is associated with premises hot water heat pump 31, and Btu meter 194 is associated with premises heat pump 24. Since each of these Btu meters can be identical, reference is made to Btu meter 190. In the example of FIG. 2, the refrigerant of the system heat pump 80 is being used as the heat transfer fluid. In this case, pressure measurements are obtained by sensors $P_A$ and $P_B$ from the respective high pressure gas and high pressure liquid lines. In addition, temperature measurements are obtained by temperature sensors TA and TB from these respective lines. In addition, the flow rate of the working fluid is measured by a flow meter F. The energy delivered to tank T3 from system heat pump 80 can then be computed in a conventional manner as the difference in the heat content of the working fluid entering the heat exchanger 110 in tank T3 and the working fluid leaving the heat exchanger 110. Because of the phase change involved, the pressure measurements are used in this calculation. An output signal on a line 196 can indicate the Btu content delivered by the SHP to the grid controller 101 and also to the controller 100. Similar outputs 198, 200 are provided from Btu meters 192, 194. If liquid from tank T3 is the working fluid that is moved to transfer heat to the tank, the heat exchanger 110 can be moved closer to, or located within, the system heat pump 80. In addition, in this case the Btu meter 190 can calculate the difference in Btus entering and leaving the heat exchanger from temperature and mass flow rates without requiring pressure information because no phase change is involved.

The heat pumps in each premises system represent the main energy consuming devices in the system. While many business models to recover costs can be created, most can be accommodated by and measuring electric energy uses, by time interval, such as by hour (or shorter interval if desired), at each heat pump/fan/pump device and by placing a Btu meter on the output of the System Heat Pump 80 (SHP). Most commonly the first cost, maintenance, and energy used by the inside, customer heat pump (CHP) will be the responsibility of the customer; nevertheless monitoring the electricity used by the SHP is desirable for the optimization of system operation, but not a requirement.

Two interesting exemplary approaches are discussed below for metering energy at the SHP. For control purposes, in one approach there desirably will be a Btu meter on the thermal output of the heat pump. In this approach, the utility (grid operator or power supplier) can meter and absorb the cost of electricity provided to the SHP from the electrical grid. As a part of this approach, the consumer (premises) can be charged (billed) for the Btus delivered to the tank system as determined by the Btu meter 190 and also charged for the electricity measured by meter 14 at the premises side of the system. The rates for the Btu usage and for the electricity usage can be converted to common units so that they can be compared. A second approach has the customer paying for the electricity used by SHP. In this case, the billing rate for power delivered to the SHP is desirably less than the maximum rate charged for peak power usage, such as a billing rate for power delivered to the SHP being at a lowest or discount rate. Consequently, since at least some of the energy provided to the premises (that is delivered to the thermal storage reservoir via the SHP) can be and desirably is billed at a lower rate than the rate for energy used by the premises obtained via meter 14, the premises benefits from lower electrical costs. Also, the utility (power provider) benefits because locations are provided for storing excess power, or in the case where renewable power outputs fluctuate, for controlling the power levels of a plurality of SHPs to vary, in the aggregate, an amount equal to the power variation of the renewable power plants. In the case where a Btu meter is used, the output of an electricity meter on the input side of the SHP and its associated auxiliary systems (fans, pumps, etc.) will be useful, but not required.

Sensors are used to provide data that can be used by the premises control unit, 100, and for occasional diagnostics, the grid operator collected via the grid controller, 101. Sensor data can include:

Flow rate, on one leg to the thermal storage reservoir from each heat pump (each SHP, each CHP, and each hot water heat pump tank HWHP).

Temperature Sensors on each leg of the output each heat pump (each SHP, each CHP, and each hot water heat pump tank HWHP) and in the case of a refrigerant thermal transfer to the storage reservoir, also pressure sensors.

Flow rate into (or out) of each tank of the thermal storage system (if there are plural tanks).

Temperature sensors at bottom and top of each tank (from which, for example, an average temperature can be computed, e.g., by adding the top and bottom temperatures and dividing by two).

Electric use (watts) of CHP, SHP, and HWHP (if any).

Outside air temperature.

House (inside) air temperature, which can comprise a plurality of such sensors.

Hourly demand forecasts for heating and cooling of a premises depend on temperature set-points of a programmable thermostat (if used) and as the customer elects temperature set point changes. The most common type of residential thermostat serves four functions 1) as a temperature sensor, 2) as a user interface for dynamic changes, 3) as a memory device to store programmable operational settings and logic programs (if any), and 4) as a device to execute control logic and signals to the "furnace"/AC & air handler system. One can locate the programmed settings and control logic now at the thermostat, instead, at the system controller 100, together with the control logic for the heat pump and air handler system. In such a case, a premises thermostat can be used that provides only for the first two functions described above. The thermostat interface can be any suitable interface, such as a web browser, a smart phone, a computer keyboard, a mouse, a touch pad, a TV with internet access and/or a dedicated home automation center. Temperature sensor data and user inputs can be conveyed to the control unit, 100 via conventional wired or wireless communication links. Sensor data delivered to controller 100, can be accessed by controller 101, e.g. from data storage tables in memory of controller 100, for use the controller 101, such as for diagnostics purposes. The controller 101 can be the overall grid controller that performs numerous functions in addition to those described herein, such as interfaces for metering electrical energy usage, grid operation programs, billing system operation, energy sales programs and so forth that are not pertinent to this disclosure. The controllers unit 100, can have associated memory (shown schematically as M at controller 100, FIG. 2) for storing the desirable control program. Desirably, the fourth function mentioned above will be co-located in the control unit for the premises system so that energy usage forecasting will have full access to the customer's customary preferences and changes thereof.

The heat pumps can be operated under any desirable operating mode, such as by selecting from plural modes of operation. Normally an objective and a specific control mode will remain constant for a time block (TB), such as a 24 hour day running, for example, between from 5 AM of one day to 5 AM of the next day, but nothing prevents the control mode from being changed at any time or the use of a time block of a different length.

As more specific examples, operating modes can include one or more of the modes described below, as well as all combinations and sub-combinations of the modes described below. The modes can be sent by a grid controller 101 and/or by the control unit 100 using a data entry device such as shown at 220 in FIG. 2 for control unit 100 and 222 in FIG. 2 for grid controller 101. A communication link 223, wired or wireless, can extend between the controllers 100, 101 such that data can be transferred there between. For example, temperature forecast data and electrical energy billing rates can be sent from the controller 101 to the controller 100 for use by controller 100 in the control of the plural heat pump storage system comprising at least one system heat pump and at least one premises heat pump (which can be a hot water heat pump).

Data for use in controlling the system is provided by suitable sensors, such as temperature sensor TI indicated at 224 in FIG. 2 for sensing the actual temperature outside the premises where the system of FIG. 2 is located. Another data input is indicated at $T_F$ corresponding to the temperature forecast, for example over a time block TB, for the region in which the premises is located at which the system in FIG. 2 is installed. Additional data that can be used in various operating modes includes flow rates between tanks as determined by flow meters in the conduits or flow paths between the tanks; a time block, such as 24 hours, over which energy usage estimates can be established for the premises, a shorter time interval TI, such as one hour, at the end of which the energy usage estimates and other data can be updated; Tstat, thermostat set points for a thermostat at the premises; a sensor TH for providing the house temperature, which can be provided at plural locations within the premises; heat pump information for the respective heat pumps in the system; house information, such as a heat loss coefficient for the house taking into consideration factors such as windows and window types, solar gain, wind, wind forecasts, household size, occupancy, the presence of air conditioning, water heating schedule $W_{HS}$ the internal thermal mass of the house; hot water demand $HW_D$; and operating mode $O_PM$.

In some operating modes none of the data is required. In other operating modes one or more of these environmental and/or operating parameters are utilized in controlling the system. In particular, some of the operating modes discussed below operate the system based at least in part upon a temperature forecast for the location in which the system is operated. In some modes a dynamic price forecast is provided at regular intervals via the grid controller, 101; depending on the mode of operation this may be the retail electric rate relevant to the customer's bill, in other cases, this may be marginal production cost forecast for the energy service provider.

With this information in mind, exemplary operating modes can comprise one or more of the following modes:

One such mode can be a default operating mode, which can be selected by the customer or premises operator. In one such default operating mode, no data inputs are utilized other than thermal storage reservoir temperature data. In one specific default approach, the system heat pump is operated to maintain a constant temperature in the thermal storage reservoirs. In the case of temperature sensors at the bottom and top of each tank, the average temperature can be maintained substantially constant at a desired magnitude. For example, the temperature can be maintained in the heat storage reservoirs within a range of a desired house temperature, such as 70 degrees Fahrenheit. The desired house temperature can be provided as a data input or a default value can be used. The temperature range, for example, can be within plus or minus 5 to 10 degrees of the desired house temperature range.

As another operating mode, the customer can select a manual control mode. When this mode is selected, for example, an instruction is provided from controller 100 to operate the system heat pump at a specified power level, the heat pump being a variable speed heat pump. For example, in this mode the heat pump can operate at a 50 percent power level.

In yet another mode, assuming the customer is being billed for electricity use as determined by meter 14. [with or without billing based on electricity provided to the system heat pump 80 or Btus provided from system heat pump 80 to the thermal storage reservoir], weather forecast data can be used in the control of the system operation. The primary weather forecast data being used in this example can be the temperature, although wind and/or solar insolation can also be considered. Since the efficiency of a heat pump is a function of temperature, based on the weather forecast, the system heat pump can be operated (or operated at higher power levels in the case of a variable speed system heat pump) in this mode over time periods corresponding to time periods when the temperature is forecast to be relatively high. As a result, during such high temperature times when operation of the system heat pump is more efficient for heating, more energy is stored in the thermal storage reservoir. In the case of using the SHP for cooling the premises, the SHP would operate more hours when the forecast is indicating cooler temperatures. On a real time basis, the actual temperature at the location can be compared with the forecasted temperature and used to adjust the operation of the system heat pump. For example, if the forecasted high temperature is to exceed 45 degrees between 2 PM and 6 PM and is forecast to drop to 35 degrees Fahrenheit between 3 AM and 5 AM, the system heat pump can be set to operate when the temperature is forecast to be 45 degrees to add heat to the system. However, on a real time basis, the actual temperature can be measured and the system heat pump started sooner or later depending upon when the 45 degree, or actual high temperature is reached. Similarly, for cooling purposes, based on the weather forecast, the system heat pump can be set to operate when the temperature is forecast to be at a low level, such as at 60 degrees Fahrenheit, for example at night, to cool the liquid in the thermal storage reservoir with the actual operating time being adjusted depending upon the measured real time temperature. With this mode of operation, even if electricity is being charged at a flat price to the customer, by operating the system heat pump during time intervals of relatively high temperature and minimizing or eliminating the operation of the system heat pump when temperatures are lower than the high temperature, greater efficiencies in energy usage to provide heat storage (heat removal) is achieved. The stored heat (cooled thermal storage liquid) can then be used at night (day) to provide heat (cooling) to the premises when the temperature drops (rises).

In a further mode of operation, assume that the utility is billing for electricity use on a time varying basis. For example, the utility is charging at a first rate (a relatively low rate) during off peak energy usage times and at a second (relatively high rate) greater than the first rate during peak times. The second rate can be the highest rate being charged by the utility. In this case, the customer can select, using controller 100, (or the utility can select using controller 101) to operate the system heat pump in a manner that minimizes the customer bill by using the system heat pump primarily during the off peak rate time. In one specific example, the system heat pump is only operated during the off peak time. In another example, the system heat pump is operated for at least a majority of time of its operation during the off peak time, or for a greater amount of time during the off peak time than during the peak billing rate time. In this mode of operation, a temperature forecast can also be used as mentioned above. Thus, a system heat pump can be operated, to providing cooling to the premises, during relatively cool temperature times that occur during off peak hours, for example. In the heating season, heating demand is often highest during the high price hours during the day, which usually is the time when it is warmest. So minimizing the customer bill (or utility), in this situation is at odds with minimizing energy use. The mode of operation can be used to determine which priority is given preference. In the summer heating season the two goals more typically can be aligned. By operating the system heat pump when electricity is being billed at a low rate to pre-cool the thermal storage reservoir, with cold fluid stored in the reservoir being used to cool the premises during on peak hours, the customer's bill is reduced.

In a variant of the mode above, the minimize utility cost mode, the marginal generation production costs can be sent to the control unit 100 as a price forecast over time. For example, utility costs for energy can be at a first cost (a relatively low cost) during off peak energy usage times and at a second (relatively high cost) greater than the first cost period during peak times. The second cost rate can be the highest cost rate for production costs of the energy. In this case, the utility can send to the controller 100, via the grid controller 101, instructions to operate the system heat pump in a manner that minimizes the utility cost by using the system heat pump primarily during the low cost time period. In one specific example, the system heat pump is only operated during the low cost time. In another example, the system heat pump is operated for at least a majority of time of its operation during the low cost time, or for a greater amount of time during the low cost time than during the high cost times.

In yet another mode of operation, the system can be operated to minimize the carbon footprint of the system. For example, a forecast of power plant emissions (carbon emissions) for various power plants can be obtained and sent to the control unit, 100 via the grid controller, 101. Some power plants are more carbon intensive (release more carbon) than other power plants. In addition, green energy, such as solar power and wind power, produce no carbon emissions. The system can be controlled in this mode to operate the system heat pumps at plural discrete locations, such as at locations having such a storage system in a particular region or area of a utility's territory, in a way that minimizes carbon emissions. For example, during sunny days when solar power is more productive, plural system heat pumps can be operated to store energy to maximize the contribution of the energy from solar sources.

These modes of operation can be combined with one another. For example, the minimize carbon footprint and minimize utility cost modes can be used together. In an alternative minimize energy use mode, which is similar to at least one of the modes discussed above, during times when heating loads are high (e.g., winter), system heat pumps can be operated (for example, in response to signals from controller 101) to operate when the temperature forecast and actual temperatures are highest or within a range, and/or the actual temperature exceeds a set point or threshold, to store heat in the thermal storage reservoir when system heat pump operation is more efficient. In the same manner, during times when cooling is expected, such as during the summer, the system heat pumps can be operated when outside temperatures are relatively low, such as below a set point based on actual temperature readings and/or temperatures found in a weather forecast.

As a still further mode of operation, energy use can be minimized during defined time periods, such as during selected AM or PM time periods when expected energy loads on the electrical grid are high. In this mode of operation, system heat pumps at the various premises are operated in response to control signals from controller 101 of the utility to run outside of the defined time periods to provide heat and/or cooling for the thermal storage reservoir outside the defined time periods, which can then be used at the premises during the defined time periods. The system heat pumps can be operated so as to not run at all during the defined time periods, or run for a lesser time during the defined time periods than other times, such as run the majority of the time outside of the defined time periods. During the defined time periods, heat or cooling can be obtained from the premises by the premises heat pump from the thermal storage reservoir to reduce electrical energy use from the grid during the defined time periods.

An energy sink mode of operation is yet another mode of operation that can be provided. Based on forecasts, operators of power generating sources and utilities have information on when excess energy is likely to be on the electrical grid. For example, a forecast can be made that there will be 200 megawatt hours of excess energy between 12 AM and 5 AM. System heat pumps at the various locations can be operated during this time period to sink this quantity of energy by transferring it to thermal storage reservoirs by operating the system heat pumps to transfer this excess energy to the various thermal storage reservoirs associated with the respective heat pumps. The Btu content of the various thermal storage reservoirs in the overall system can be tracked and maintained prior to sinking the energy to provide sufficient capacity for the thermal storage reservoirs to absorb and sink this quantity of energy.

In a remote utility override mode, in a desirable example where variable speed system heat pumps are utilized to compensate for renewable generation that has large variations in power output, controller 101 can send signals to the system heat pumps (and/or to any selected group of such system heat pumps), to operate at specified power levels with the system heat pumps responding to the control signals to adjust their operation to such levels. For example, in this remote override mode, a control signal can be sent from the grid controller 101 instructing the SHP 80 to operate at a power level specified by the instruction. The instruction can include a designated time for the SHP to operate at the specified power level. Alternatively, The SHP can be controlled to operate at the specified power level until another signal is sent from the grid controller to change the specified power level or the system is no longer in the remote override mode. In the remote override mode, the premises system can be controlled to absorb more or less power from the grid. The energy used would equal the power level of the SHP times the duration that the SHP is at the specified power level.

Assume a power outage has occurred that affects premises having the systems described herein. If enough systems are impacted by the power outage, it is undesirable for all of these systems to start operating to in effect recharge the thermal storage reservoirs simultaneously when the power outage is over as this can overload the electric grid. Therefore, in a recovery from power outage mode, signals from controller 101 can be provided to system heat pumps, as well as to selected groups of such heat pumps, to follow a ramp up operating procedure. In a ramp up operating procedure, the operation of the system heat pumps in the case of variable speed system heat pumps, can be gradually increased over a ramp up time period in a manner that does not overload the electrical grid. For example, the system heat pumps can be ramped up at a linear rate from zero percent to their pre-power outage applicable rate for the operating conditions then in existence over a long time period, such as over 6 to 10 hours. Other ramp up rates can be used in this mode of operation.

In a loss communications mode (such as weather forecasting data being lost and/or control signals from controller 101 being lost), default conditions stored in memory M of controller 100 can be used to control the operation of the system. For example, an average temperature for the day can be used with the average temperature obtained from historical data and/or otherwise stored in the memory M. In addition, night time and day time operating parameters can be used, such as the system heat pump being run during the day to store energy where heat loads are expected based on average temperatures for the day and being run at night where cooling loads are expected.

In a clock failure mode, wherein the clock utilized to determine time intervals TI and real time measurements fails, an alert can be sent to controller 101. In addition, the system can be operated in a default operation mode, or in a specified mode such as maintaining a specified temperature in the thermal storage reservoir (e.g., an average temperature of 70 degrees Fahrenheit).

The operational modes together with time, weather forecast and static or semi static attributes associated with the house determine can thus be used in controlling the system. These attributes can be determined for time intervals (TIs) that are of a duration that is less than a time block TB, such as Tis that are one hour long. Thus, for example, the following can be determined:
  the desired average temperature of each tank at beginning and end of each adjustment period (TI).
  the valve configurations for the tank plumbing for each adjustment period (TI).

There can be two time domains for the control method in one specific example. One is the "real-time" process, the other is the management of the tank temperatures over the planning horizon (TB), such as a day. For the purpose of discussion, the real-time process will be discussed as occurring on regular intervals, such as every minute. Adjustments to the tank temperature management process will be discussed as occurring on regular intervals (TI), that are of a shorter duration than the time block, such as every hour. These interval durations can be arbitrarily chosen, mainly to simplify the discussion. With today's low cost of electronic processing power and memory, the difference in system cost to reduce these interval durations by a factor of ten or more will not be significant. Any use of the word "hourly" in this description for a time interval TI is used as an example, as the time will actually be the selected TI, such as chosen for adjusting tank temperature.

In an exemplary real time process, the system can:
  Compute (meter) energy delivered, tank to CHP (or each if more than one CHP, such as using one or more Btu meters).
  Compute (meter) energy delivered, tank to HWHP (or each if more than (one HWHP), such as using one or more Btu meters).
  Compute (meter) energy delivered SHP to tank (such as via one or more Btu meters).

Compute (meter) energy delivered, tank to SHP defrost cycle, if any, (such as using one or more Btu meters).

Revise average tank temp for each tank separately (via Btu meter).

Adjust output level of SHP at request of utility or grid system operator needs.

Record kWh input to each heat pump, if available.

The simplest operating approach for managing thermal storage tank temperatures involves the objective of minimize energy use with the simplifying assumptions that outside temperature remains constant and inside temperature remains constant. In this case one outcome can be the maintenance of a constant tank temperature that minimizes the combined wattage require by SHP and CHP, with both heat pumps operated at constant power level that, together, maintain a constant temperature in the home. The temperature selected will be a function of the specific size and efficiency of each heat pump, which in turn, are a function of the input and output temperatures of the heat pumps. In the real world both inside and outside temperatures vary, hence desirably a forecast of the inside and outside temperature can be used.

In one process of optimizing the benefit for each operation mode, an ideal temperature for each tank can be set for the end of each TI, such as each hour. One goal of the exemplary approach in FIG. 6 is to ensure that indoor comfort is maintained while not exceeding the constraints defined by the tank sizes and their max min temperatures, outdoor temperature, heat pump sizes and efficiencies.

Figure 6:
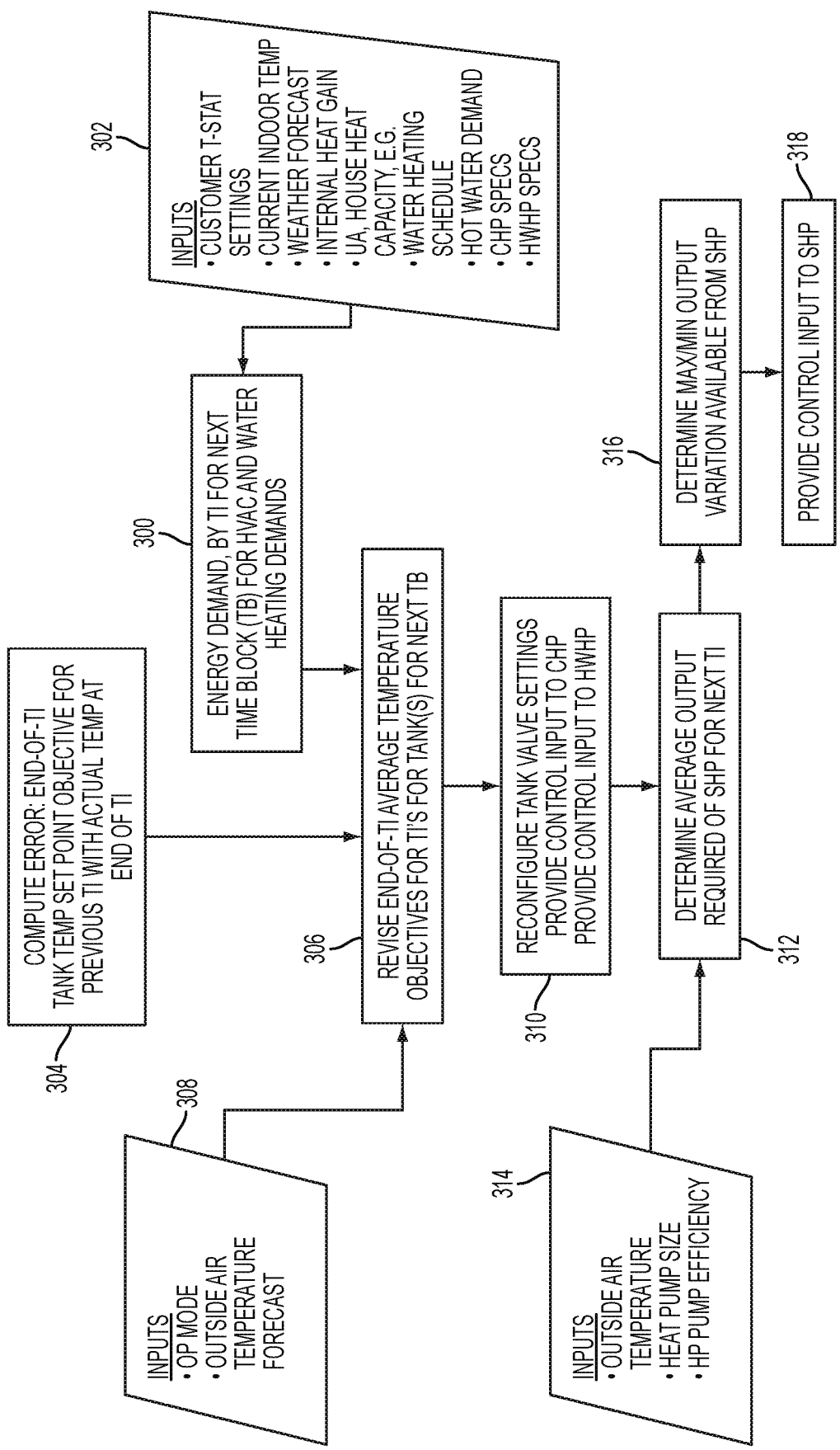
FIG. 6 is a schematic illustration of one exemplary control method that can be used in controlling the embodiments of FIGS. 1-5.

In the example operating mode of FIG. 6, a time block TB is established, such as 24 hours. The time block TB is divided into time intervals, each indicated by TI, such as of one hour length. At block 300, an energy demand estimate for the premises for the time block, by time interval, for heating, air conditioning and water heating demands, is computed using parameter inputs, such as indicated in block 302. More or fewer environmental and operating parameters can be utilized, it being recognized that the energy demand estimate is more accurate if more parameters are used. For example, if hot water demand is not known, it can be ignored or assigned a constant energy usage value, even though this would be less accurate. At block 304, a determination is made of the difference between the tank temperature objective at the end of a TI with the actual tank temperature at the end of TI. If there is a mismatch, at block 306 the end of TI average temperature objectives for each of the TIs for the next TB is revised. This example is based on the designated operating mode and an outside air temperature forecast indicated by the inputs from block 308. At block 310, the various tank valve settings (in the case of a plural tank thermal storage reservoir) are adjusted to control the flow between the tanks to achieve the TI objective for the individual tanks. At block 312, the average output required of the system heat pump for the next time interval TI to achieve the temperature objectives is determined. In this example, inputs 314 are utilized in this determination, namely the outside temperature, heat pump size (of the SHP) and the SHP heat pump efficiency. At block 316, the maximum and minimum output variations available from the SHP at the given outside air temperature are determined so that the SHP is controlled to operate within these limits; this is desirable during the operation of the utility remote control mode. At block 318 a control signal is provided to the system heat pump to control the system heat pump to operate in a manner that follows the tank set point objectives given the energy demand estimate.

The process of FIG. 6 is repeated in this example at the beginning of each time interval TI.

Thus, the tank temperature requirements are estimated as a function of time in this control strategy in order to meet energy demand and comply with the selected operating mode.

TABLE I

Input data that can be used in operation of the control system
Default "X" means value are entered into non-volatile memory of the control computer at time of installation, but are normally obtained daily or hourly from communication network
Static "X" means a physical attribute that rarely changes, "S" means a semi-static value that generally depends on customer use of the home.
Acquired means that for efficient operation the utility will convey information on a daily or hourly basis as part of its responsibilities.
Learned or derived, means through analytic methods either in the control system and/or available to the utility the initial static input variables might be improved upon using 10 historical data collected from the system.
"*" means this input is desirable but not required

| Input | Default | Static | Acquired | Learned | Comment |
|---|---|---|---|---|---|
| Weather Forecast | X | | X | | 365 days of min max outside temp |
| *Window Configuration | | X | | | Sq Ft and direction |
| *Solar Gain | X | | X | | Avg solar insolation by week |
| *Wind | | X | | X | Air exchanges/hr = f(wind spd) |
| *Wind Forecast | X | | X | | Avg & std dev wind spd by week |
| Time/Date | 1 | | X | | |
| *Household size | | S | | | |
| *Occupancy Sensor | | | | X | |
| *Customer HVAC recovery pref. | | S | | | Tolerance for drift from preferred temp while gone |
| UA | | X | | | Heat loss coefficient of house |

TABLE I-continued

Input data that can be used in operation of the control system
Default "X" means value are entered into non-volatile memory of the control computer at time of installation, but are normally obtained daily or hourly from communication network
Static "X" means a physical attribute that rarely changes, "S" means a semi-static value that generally depends on customer use of the home.
Acquired means that for efficient operation the utility will convey information on a daily or hourly basis as part of its responsibilities.
Learned or derived, means through analytic methods either in the control system and/or available to the utility the initial static input variables might be improved upon using 10 historical data collected from the system.
"*" means this input is desirable but not required

| Input | Default | Static | Acquired | Learned | Comment |
|---|---|---|---|---|---|
| Internal thermal mass of house | X | | | X | Determines energy requirement for heating/cooling recovery |

Notes
1. The low accuracy clock operates on a battery back-up similar to a personal computer but it adjusted at least daily to maintain accuracy. In the event of clock failure the system sends an alarm to the utility and enters into the clock failure mode.

TABLE 2

Historical Data Maintained in the Control System
The purpose of storing this data is to make it available at a later date to one or more service providers for one more of the following purposes:
Execution of billing/business model
Troubleshooting improper operation

| Stored Data | Interval | Comment |
|---|---|---|
| SHP kWh | hour | |
| CHP kWh | Hour | |
| HWHP kWh input | Hour | |
| SHP Btu output | Hour | |
| SHP Btu defrost input | Hour | |
| CHP tank Btu input | hour | |
| End-of-hr tank temperature error | hour | |
| Avg outside temp | hour | |
| Avg inside temp | hour | |

In this disclosure, singular terms such as "a" and "an" are to be construed to include the plural as well as the singular and vice versa. Thus, for example, if there are two or more of an element, there is also a or an of such element. In addition, the term "coupled" includes both direct connection and indirect connection through one or more additional elements.

Having illustrated and described the principles of my invention and with reference to a number of embodiments, it should be apparent to those of ordinary skill in the art that the invention may be modified in arrangement and detail without departing from these principles. All such modifications fall within the scope of this disclosure.

I claim:

1. A system for storing energy from an electrical grid, the system comprising:
   at least one energy storage system at each of a plurality of different premises, each energy storage system at each premise comprising:
   a thermal storage reservoir at the premise for containing liquid that can be heated or cooled to respectively add energy to or remove energy from the thermal storage reservoir at the premise;
   a system heat pump at the premise coupled to the electrical grid to receive electrical energy from the electrical grid to power the system heat pump, the system heat pump being operable to convert electrical energy from the electrical grid to thermal energy, the system heat pump being coupled to the thermal storage reservoir and operable in at least one of: (a) a heating cycle to deliver thermal energy to the thermal storage reservoir to heat the liquid in the thermal storage reservoir at the premise, and (b) a cooling cycle to remove thermal energy from the thermal storage reservoir to cool the liquid in the thermal storage reservoir;
   a premises heat pump at the premise coupled to the electrical grid to receive electrical energy from the electrical grid to power the premises heat pump, the premises heat pump being coupled to the thermal storage reservoir at the premise and operable to perform at least one of: (a) removing thermal energy from the thermal storage reservoir at the premise to provide heat to the premise, and (b) delivering thermal energy from the premise to the thermal storage reservoir to provide cooling of the premise;
   a first controller coupled to the system heat pump and operable to control the system heat pump at the premise in at least one of: (a) the heating cycle so as to deliver thermal energy to the thermal storage reservoir at the premise; and (b) the cooling cycle so as to remove thermal energy from the thermal storage reservoir, and wherein the premises heat pump is operable independently of whether the system heat pump at the premise is delivering thermal energy to or removing thermal energy from the thermal storage reservoir at the premise; and
   the system for storing energy from the electrical grid further comprising a grid controller coupled to the first controllers at the plurality of different premises, the first controllers at the plurality of different premises being responsive to signals from the grid controller to operate the system heat pumps at the plurality of different premises in said at least one of the: (a) heating cycle and (b) the cooling cycle independently of operation of the premises heat pumps to provide heat to the premises or to provide cooling of the premises using the thermal storage reservoir.

2. The system according to claim 1, wherein the system heat pump at each of the plurality of premises is operable in both of the heating and cooling cycles, and the first controllers at the plurality of different premises being responsive to signals from the grid controller to operate the system heat pumps at the plurality of different premises in the heating and cooling cycles to: (a) in heating cycles, store excess power from the electrical grid by adding thermal energy to the thermal storage reservoirs at the plurality of different premise locations; and (b) in cooling cycles, store excess power from the electrical grid by removing thermal energy from the thermal storage reservoirs at the plurality of different premises.

3. The system according to claim 1 wherein each energy storage system comprises a first electricity meter for measuring electrical energy delivered from the electrical grid to the premise location including to the premises heat pump, but not including the electricity delivered to the system heat pump, and a second electricity meter for measuring electrical energy delivered from the electrical grid to the system heat pump, and a Btu meter measuring the thermal energy delivered to or removed from the thermal storage reservoir by the system heat pump.

4. The system according to claim 1 wherein the system heat pump at each of the plurality of premises is coupled to an associated thermal storage reservoir at the premise where the system heat pump is located and operated in response to signals from the grid controller to deliver thermal energy to the associated thermal storage reservoir when the grid controller determines that wind or solar energy sources coupled to the electrical grid in combination with other electric power generating sources coupled to the electrical grid are producing more power than the electrical demand on the electrical grid or producing more power than forecasted.

5. The system according to claim 1 wherein the thermal storage reservoir comprises plural tanks with liquid flow paths there between and wherein the flow of liquid between the tanks is controlled to control the temperature of the liquid in the respective tanks.

6. The system according to claim 1 wherein a plurality of said energy storage systems each comprise a hot water heat pump coupled to the electrical grid to receive electrical energy from the electrical grid, the hot water heat pump being coupled to the thermal storage reservoir and operable to remove thermal energy from the thermal storage reservoir for delivery to the premises at the location to provide heat for heating water at the premises, the hot water heat pump being operable to remove thermal energy from the thermal storage reservoir independently of whether the system heat pump is delivering thermal energy to the thermal storage reservoir, and wherein the system heat pump is operable to deliver thermal energy to the thermal storage reservoir independently of whether the hot water heat pump is removing heat from the thermal storage reservoir.

7. The system according to claim 1 wherein each energy storage system comprises a first electricity meter operable to measure electrical energy delivered from the electrical grid to the premises other than to the system heat pump and a second meter operable to measure at least one of the thermal energy delivered from the system heat pump to the thermal storage reservoir or removed from the thermal storage reservoir by the system heat pump, and wherein the second meter is a Btu meter located at or downstream from the output of the system heat pump.

8. The system according to claim 1 wherein energy usage at the premise location is estimated for a time block by the first controller, the estimated energy usage for the premise location for the time block being updated for first time intervals that are of a shorter duration than the time block, actual energy usage being computed by the first controller at second time intervals shorter than the first time intervals and being used to update the estimated energy usage for the time block, the system heat pump being operated by the first controller to deliver energy to the thermal storage reservoir based at least in part on the estimated energy usage at the premise location.

9. The system according to claim 1 wherein energy from electrical power sources provided to the electrical grid is provided at first and second costs, the second cost being higher than the first cost, the system heat pump being operated by the first controller a greater amount of time that energy is provided at the first cost than the amount of time the system heat pump is operated when energy is provided at the second cost.

10. The system according to claim 1 wherein the system heat pump is operated by the first controller based at least in part upon a temperature forecast obtained by the first controller to deliver energy to the thermal storage reservoir during one or more time intervals of a time block when the forecasted temperature is higher than the forecasted temperature for other time intervals of the time block, wherein the system heat pump is also operated by the first controller based at least in part upon the temperature forecast to remove energy from the thermal storage reservoir during one or more time intervals of a time block when the forecasted temperature is lower than the forecasted temperature for other time intervals of the time block.

11. The system according to claim 1 wherein the first controller, premises heat pump and system heat pump at a premise location are respectively an associated first controller, an associated premises heat pump and an associated system heat pump, wherein the grid controller is remote from the premise location, and wherein the first controller of each of the plurality of energy storage systems comprises an input for receiving control signals from the grid controller and wherein the first controller at each premise is operable to control the associated system heat pump in a plurality of modes in response to the control signals and wherein the operation of the system heat pump at the plurality of premises is controlled in response to the control signals.

12. The system according to claim 11 wherein one of said modes comprises a power sink mode, wherein in response to control signals comprising forecasts of the likelihood of excess energy being available on the electrical grid, the respective first controllers of the plurality of the energy storage systems at different premises, in response to said control signals from the grid controller, control the operation of the associated system heat pumps at the different premises to sink a quantity of energy from the electrical grid into the thermal storage reservoirs at the different premise locations.

13. The system according to claim 11 wherein one of said modes comprises a remote override mode, wherein in response to control signals from the grid controller the respective first controllers of the plurality of energy storage systems at different premises control the operation of their associated system heat pumps at the plurality of different premises so as to operate at power levels designated by the control signals, the system heat pumps at the plurality of different premise locations being variable speed heat pumps responsive to their associated first controllers to operate at the power levels designated by the control signals from the grid controller.

14. The system according to claim 11 wherein one of said modes comprises a minimize energy use during specified time period mode, wherein one or more time periods are specified by the grid controller during which energy use is to be minimized, wherein in response to control signals from the grid controller, the first controller at each of the plurality of premises controls the operation of the associated system heat pump to operate in the heating cycle or the cooling cycle a greater amount of time outside the specified time periods than within the specified time periods.

15. The system according to claim 11 wherein one of said modes comprises a minimize total energy use mode, wherein based at least in part upon a temperature forecast control signal from the grid controller, the first controller at each of the plurality of premises controls the operation of the associated system heat pump in the heating cycle to store thermal energy in the associated thermal storage reservoir a greater amount of time during one or more time intervals of a time block determined by the first controller when forecasted temperatures are higher than the forecasted temperatures for other time intervals of the time block, and wherein based at least in part upon a temperature forecast control signal from the grid controller, the first controller at each of the plurality of premises controls the operation of the associated system heat pump in the cooling cycle to remove thermal energy from the thermal storage reservoir a greater amount of time during one or more time intervals of a time block when forecasted temperatures are lower than the forecasted temperatures for other time intervals of the time block.

16. The system according to claim 11 wherein one of said modes comprises a minimize carbon footprint mode, wherein the control signal from the grid controller is based in part on a forecast of carbon per kWh generated by electrical power sources providing electrical energy to the electrical grid, the carbon production from such sources being forecast at first and second levels, the second level corresponding to a forecasted carbon production by such power sources that is greater than the first level of forecasted carbon production by such power sources, wherein the respective first controllers of the energy storage systems at the plurality of premises control the operation of their associated system heat pump in the heating cycle or the cooling cycle to store a greater amount of energy in, or remove a greater amount of energy from, the associated thermal storage reservoir at times when carbon production from the power sources is forecast by the grid controller to be at the first level than the amount of energy stored in or removed from the thermal storage reservoirs at the different premise locations at times when carbon production of such power sources is forecast to be at the second level.

17. The system according to claim 11 wherein one of said modes comprises a minimize utility cost mode based on a forecast of utility marginal power production costs, wherein during such minimize utility cost mode the first controllers, in response to control signals from the grid controller, control the operation of their associated system heat pumps to operate in the heating or cooling cycle a greater amount of time during time periods when the marginal energy production cost to the utility are at a first cost and to operate in the heating cycle or the cooling cycle a lesser amount of time during time periods when the marginal energy production cost is at a second cost that is higher than the first cost.

18. The system according to claim 11 wherein one of said modes comprises a recovery from power outage mode wherein, following a power outage, the system heat pumps at plural locations that suffered the power outage are operated in the heating cycle or the cooling cycle at a controlled ramp up rate.

19. The system according to claim 1, wherein:
each of the system heat pumps is controlled by their respective first controller in response to control signals from the grid controller to operate in a selected one of a plurality of modes;

wherein one of said modes comprises a power sink mode, wherein in response to control signals from the grid controller comprising forecasts of the likelihood of excess energy being available on the electrical grid, the respective first controllers of the plurality of the energy storage systems at different premises, in response to said control signals from the grid controller, control the operation of the associated system heat pumps at the different premises in the heating cycle or the cooling cycle to sink a quantity of energy from the electrical grid into the thermal storage reservoirs at the different premise locations;

wherein one of said modes comprises a remote override mode, wherein in response to control signals from the grid controller the respective first controllers of the plurality of energy storage systems at different premises control the operation of their associated system heat pumps at the plurality of different premises in the heating cycle or the cooling cycle so as to operate at power levels designated by the control signals, the system heat pumps at the plurality of different premise locations being variable speed heat pumps responsive to their associated first controllers to operate at the power levels designated by the control signals from the grid controller;

wherein one of said modes comprises a minimize energy use during specified time period mode, wherein one or more time periods are specified by the grid controller during which energy use is to be minimized, wherein in response to control signals from the grid controller, the first controller at each of the plurality of premises controls the operation of the associated system heat pump to operate in the heating cycle or the cooling cycle a greater amount of time outside the specified time periods to store thermal energy in the thermal storage reservoir outside of the specified time periods;

wherein one of said modes comprises a minimize carbon footprint mode, wherein the control signal from the grid controller is based in part on a forecast of carbon per kWh generated by electrical power sources providing electrical energy to the electrical grid, the carbon production from such sources being forecast at first and second levels, the second level corresponding to a forecasted carbon production by such power sources that is greater than the first level of forecasted carbon production by such power sources, wherein the respective first controllers of the energy storage systems at the plurality of premises controls the operation of their associated system heat pump in the heating cycle or the cooling cycle to store a greater amount of energy in the associated thermal storage reservoir at times when carbon production from the power sources is forecast to be at the first level than the amount of energy stored in the thermal storage reservoirs at the different premise locations at times when carbon production of such power sources is forecast to be at the second level;

wherein one of said modes comprises a minimize utility cost mode based on a forecast of utility marginal power production costs, wherein during such minimize utility cost mode the first controllers, in response to control signals from the grid controller, control the operation of their associated system heat pumps to operate in the heating cycle or the cooling cycle a greater amount of time during time periods when the marginal energy production cost to the utility are at a first cost and to operate a lesser amount of time during time periods when the marginal energy production cost is at a second cost that is higher than the first cost; and wherein one of said modes comprises a recovery from power outage mode wherein, following a power outage, the system heat pumps at plural locations of the plurality of locations that suffered the power outage are operated in the heating cycle or the cooling cycle at a controlled ramp up rate in response to control signals from the grid controller to deliver energy to or remove energy from the thermal storage reservoirs of the energy storage systems that suffered the power outage.

20. A method of storing energy from an electrical grid, comprising: storing electrical energy in at least one energy storage system at each of a plurality of different premises, each energy storage system at each premise comprising an associated thermal storage reservoir at the premise for containing liquid that can be heated or cooled to respectively add energy to or remove energy from the thermal storage reservoir at the premise, each energy storage system comprising an associated system heat pump coupled to the associated thermal storage reservoir and coupled to the electrical grid to receive electrical energy from the electrical grid to power the system heat pump, each energy storage system further comprising an associated premises heat pump coupled to associated thermal storage reservoir and to the electrical grid to receive electrical energy from the electrical grid to power the premises heat pump, and each energy storage system including an associated first controller coupled to the associated system heat pump;

operating the system heat pumps at a plurality of the different premises in at least one of: (a) a heating cycle to deliver thermal energy to their associated thermal storage reservoirs to heat the liquid in their associated thermal storage reservoirs at the plurality of premises, and (b) a cooling cycle to remove thermal energy from their associated thermal storage reservoirs to cool the liquid in their associated thermal storage reservoirs;

operating the premise heat pumps at the plurality of the different premises to perform at least one of: (a) removing thermal energy from the thermal storage reservoir at the premise to provide heat to the premise, and (b) delivering thermal energy from the premise to the thermal storage reservoir to provide cooling of the premise;

operating the first controllers to control the associated system heat pumps at the plurality of different premises in at least one of: (a) the heating cycle so as to deliver thermal energy to the thermal storage reservoir at the premise; and (b) the cooling cycle so as to remove thermal energy from the thermal storage reservoir;

operating the premises heat pumps at the different locations independently of whether the associated system heat pumps at the different premises is delivering thermal energy to or removing thermal energy from the thermal storage reservoir at the premise; and operating a grid controller coupled to the first controllers at the plurality of different premises with the first controllers at the plurality of different premises being responsive to signals from the grid controller to operate the system heat pumps at the plurality of different premises in said at least one of the: (a) heating cycle and (b) the cooling cycle independently of operation of the premises heat pumps to provide heat to the premises or to provide cooling of the premises using the thermal storage reservoir.

21. The method according to claim 20 comprising controlling the operation of the system heat pumps to operate to deliver thermal energy to or remove thermal energy from the associated thermal storage reservoirs during at least some of the time when wind or solar energy sources coupled to the electrical grid in combination with other power generating sources coupled to the electrical grid are producing more power than the electrical demand on the electrical grid or are producing more power than forecasted.

22. The method according to claim 20 comprising estimating the energy usage at the premises for a time block, updating the estimated energy usage for the premises for the time block at first time intervals that are of a shorter duration than the time block, determining actual energy usage at the premises during second time intervals shorter than the first time intervals and updating the estimated energy usage at the premises for the first time intervals based upon the actual energy usage at the premises, the system heat pump being operated based at least in part on the estimated energy usage for the premises.

23. The method according to claim 20 comprising controlling the operation of the system heat pumps to deliver thermal energy to or remove thermal energy from their associated thermal storage reservoirs during a time period when the forecasted temperature is higher than the forecasted temperature for other time periods.

24. The method according to claim 20 comprising measuring the electricity delivered to a premise location other than the electricity delivered to the system heat pump at the premise location, and measuring the thermal energy delivered by the system heat pump to, and removed by the system heat pump from, the thermal storage reservoir at the premise location, and further comprising determining the energy usage at the premise location by adding the measured thermal energy and the measured electricity delivered to the premise location other than the electricity delivered to the system heat pump.

25. A system for storing energy from an electrical grid, the system comprising:

at least one energy storage system at each of a plurality of different premises, each energy storage system at each premise comprising:

a thermal storage reservoir at the premise for containing liquid that can be heated or cooled to respectively add energy to or remove energy from the thermal storage reservoir at the premise;

a system heat pump at the premise coupled to the electrical grid to receive electrical energy from the electrical grid to power the system heat pump, the system heat pump being coupled to the thermal storage reservoir and operable in a heating cycle to deliver thermal energy to the thermal storage reservoir to heat the liquid in the thermal storage reservoir at the premise and operable in a cooling cycle to remove thermal energy from the thermal storage reservoir to cool the liquid in the thermal storage reservoir at the premise location;

a premises heat pump at the premise coupled to the electrical grid to receive electrical energy from the electrical grid to power the premises heat pump, the premises heat pump being coupled to the thermal storage reservoir at the premise and operable to: (a) remove thermal energy from the thermal storage reservoir at the premise to provide heat to the premise, and (b) deliver thermal energy from the premise to the thermal storage reservoir to provide cooling of the premise;

a first controller coupled to the system heat pump and operable to control the system heat pump at the premise in the heating cycle so as to deliver thermal energy to the thermal storage reservoir at the premise and in the cooling cycle to remove thermal energy from the thermal storage reservoir, wherein the premises heat pump is operable to remove thermal energy from the thermal storage reservoir at the premise independently of whether the system heat pump at the premise is delivering thermal energy to or removing thermal energy from the thermal storage reservoir at the premise; and the system for storing energy from the electrical grid further comprising a grid controller coupled to the first controllers at the plurality of different premises, the first controllers at the plurality of different premises being responsive to signals from the grid controller to operate the system heat pumps at the plurality of different premises in the heating and cooling cycles independently of operation of the premises heat pumps to provide heat to the premises or to provide cooling of the premises using the thermal storage reservoir;

wherein each energy storage system comprises a first electricity meter for measuring electrical energy delivered from the electrical grid to the premise location including to the premises heat pump, but not including the electricity delivered to the system heat pump, and a second electricity meter for measuring electrical energy delivered from the electrical grid to the system heat pump, and a Btu meter measuring the thermal energy delivered to and removed from the thermal storage reservoir by the system heat pump: and wherein energy from power sources provided to the electrical grid is provided at first and second costs, the second cost being higher than the first cost, the system heat pumps at different premises being operated in response to control signals from the grid controller a greater amount of time that energy is provided at the first cost than the amount of time the system heat pumps are operated when energy is provided at the second cost.

26. The method according to claim 20 comprising: remotely controlling the operation of a plurality of the system heat pumps at a plurality of different premises in response to signals from the grid controller to store thermal energy in and remove thermal energy from their associated thermal storage reservoirs to respectively heat and cool the associated thermal storage reservoirs and thereby sink electrical power from the electrical grid; and remotely controlling the operation of the plurality of system heat pumps at the plurality of different premises to store thermal energy in and remove thermal energy from their associated thermal storage reservoirs independently of the operation of the associated premises heat pumps at the plurality of premise locations.

\* \* \* \* \*